United States Patent
Rafii

(10) Patent No.: US 9,207,773 B1
(45) Date of Patent: *Dec. 8, 2015

(54) TWO-DIMENSIONAL METHOD AND SYSTEM ENABLING THREE-DIMENSIONAL USER INTERACTION WITH A DEVICE

(71) Applicant: Aquifi, Inc., Palo Alto, CA (US)

(72) Inventor: Abbas Rafii, Palo Alto, CA (US)

(73) Assignee: AQUIFI, INC., Palo Alto, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 14/222,341

(22) Filed: Mar. 21, 2014

Related U.S. Application Data

(63) Continuation of application No. 13/506,743, filed on May 14, 2012, now Pat. No. 8,686,943, which is a continuation-in-part of application No. 13/385,134, filed on Feb. 3, 2012, now Pat. No. 8,723,789.

(60) Provisional application No. 61/518,847, filed on May 13, 2011.

(51) Int. Cl.
  *G06F 3/01* (2006.01)
  *G06K 9/00* (2006.01)

(52) U.S. Cl.
  CPC ............ *G06F 3/017* (2013.01); *G06K 9/00214* (2013.01)

(58) Field of Classification Search
  CPC ....... G06F 3/016; G06F 3/0304; G06F 3/042; G06F 3/011; G06F 2203/04104; G06F 2203/04108; G06K 9/00389; G06K 9/4671
  USPC .......................................................... 345/156
  See application file for complete search history.

(56) References Cited

U.S. PATENT DOCUMENTS

| | | | |
|---|---|---|---|
| 5,852,672 A | 12/1998 | Lu | |
| 6,834,120 B1 | 12/2004 | LeClerc | |
| 7,653,883 B2 | 1/2010 | Hotelling | |
| 8,180,114 B2 | 5/2012 | Nishihara | |
| 2002/0140633 A1 | 10/2002 | Rafii | |
| 2005/0134853 A1 | 6/2005 | Ingleson | |
| 2007/0057946 A1 | 3/2007 | Albreck | |
| 2007/0159455 A1* | 7/2007 | Lin | G06F 3/0304 345/156 |
| 2009/0103780 A1 | 4/2009 | Nishihara | |
| 2009/0110301 A1 | 4/2009 | Schopp | |
| 2010/0110384 A1 | 5/2010 | Maekawa | |
| 2011/0291926 A1 | 12/2011 | Gokturk | |
| 2012/0060177 A1* | 3/2012 | Stinson, III | H04N 21/4223 725/12 |

(Continued)

*Primary Examiner* — Kumar Patel
*Assistant Examiner* — Vinh Lam
(74) *Attorney, Agent, or Firm* — Michael A. Kautman, Esq.

(57) ABSTRACT

User interaction with a display is detected substantially simultaneously using at least two cameras whose intersecting FOVs define a three-dimensional hover zone within which user interactions can be imaged. Separately and collectively image data is analyzed to identify a relatively few user landmarks. A substantially unambiguous correspondence is established between the same landmark on each acquired image, and a three-dimensional reconstruction is made in a common coordinate system. Preferably cameras are modeled to have characteristics of pinhole cameras, enabling rectified epipolar geometric analysis to facilitate more rapid disambiguation among potential landmark points. Consequently processing overhead is substantially reduced, as are latency times. Landmark identification and position information is convertible into a command causing the display to respond appropriately to a user gesture. Advantageously size of the hover zone can far exceed size of the display, making the invention usable with smart phones as well as large size entertainment TVs.

23 Claims, 18 Drawing Sheets

(56) References Cited

U.S. PATENT DOCUMENTS

2012/0172126 A1* 7/2012 Padovani ............... G06F 3/011
   463/36

2012/0270653 A1   10/2012 Kareemi
2014/0125663 A1*  5/2014 Zhang ............... G06K 9/00214
   345/420

* cited by examiner

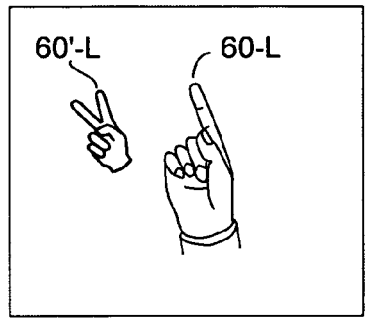
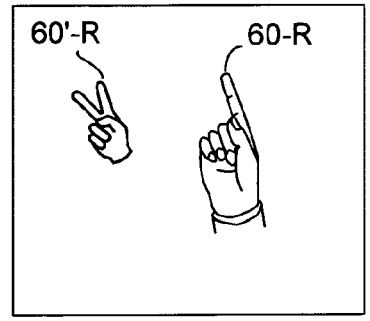
FIG. 4D  FIG. 4E
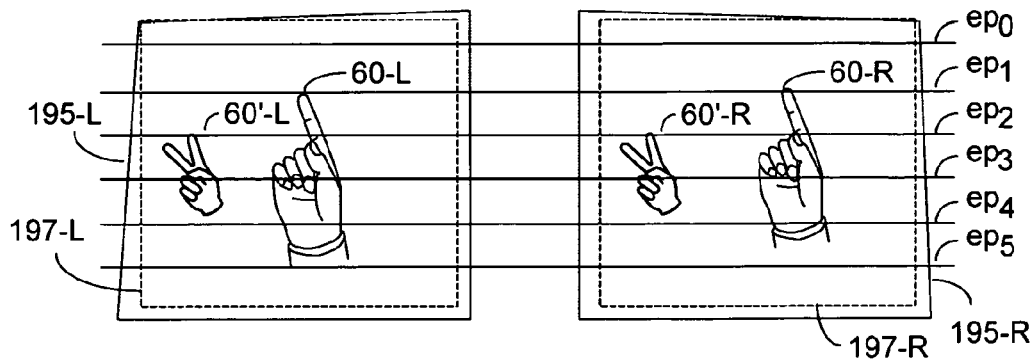
FIG. 4F  FIG. 4G

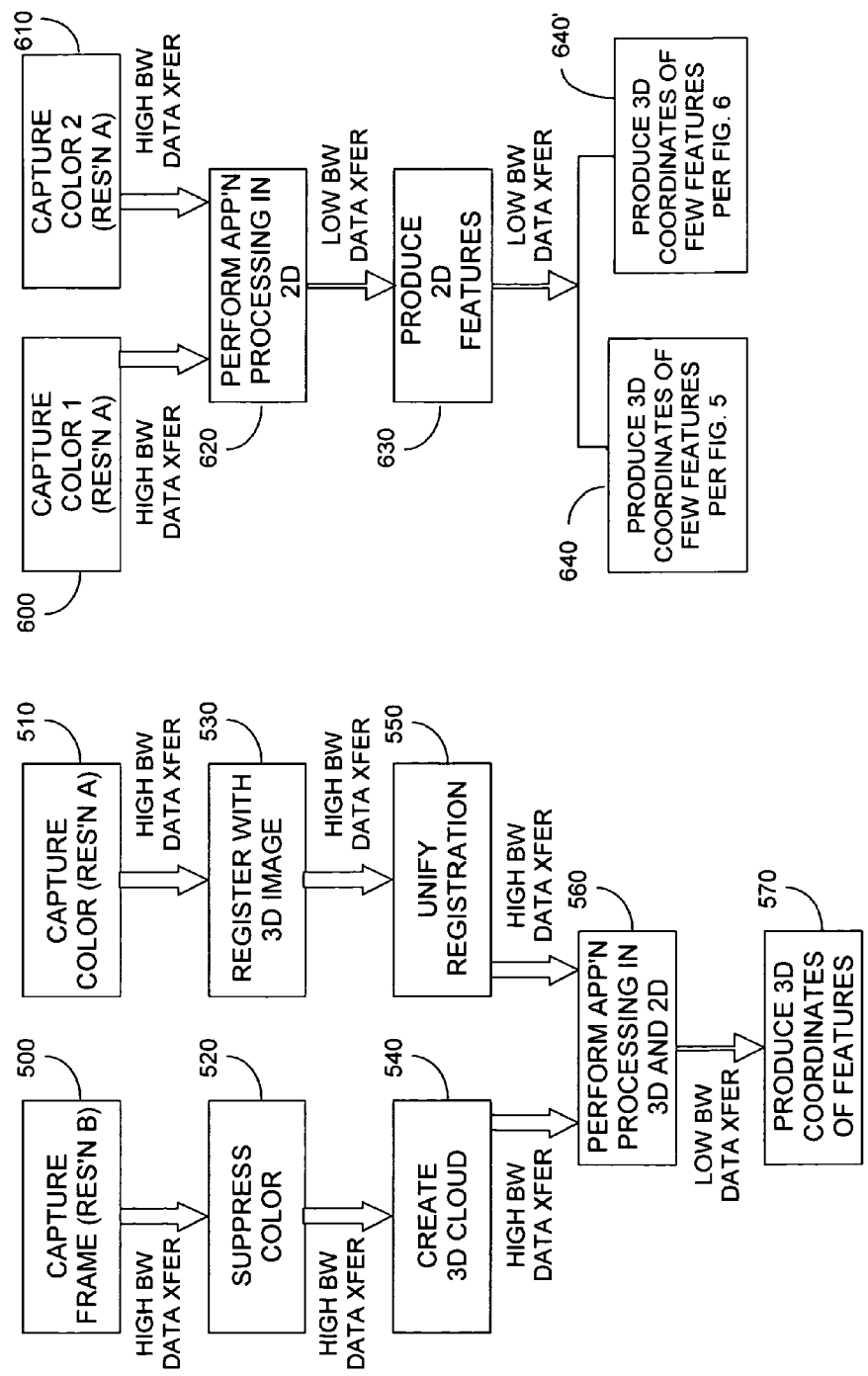

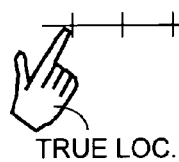 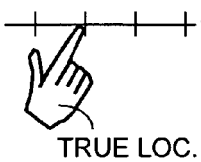 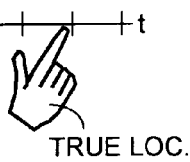 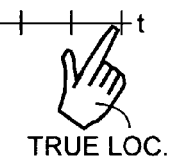
TRUE LOC.　　　TRUE LOC.　　　TRUE LOC.　　　TRUE LOC.
FIG. 8A　　　FIG. 8B　　　FIG. 8C　　　FIG. 8D
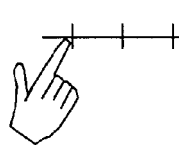 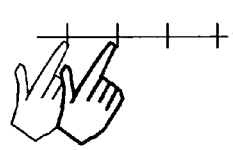 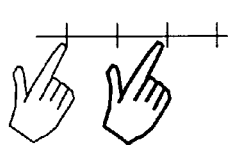 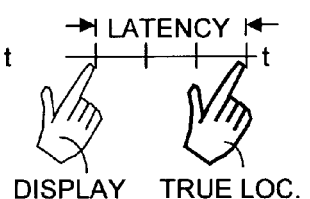
DISPLAY　TRUE LOC.
FIG. 8E　　　FIG. 8F　　　FIG. 8G　　　FIG. 8H
(PRIOR ART)　(PRIOR ART)　(PRIOR ART)　(PRIOR ART)
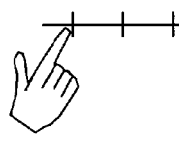 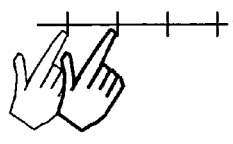 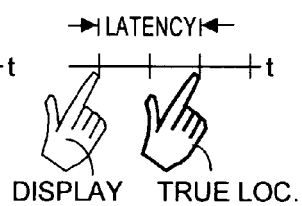
DISPLAY　TRUE LOC.
FIG. 8I　　　FIG. 8J　　　FIG. 8K

TWO-DIMENSIONAL METHOD AND SYSTEM ENABLING THREE-DIMENSIONAL USER INTERACTION WITH A DEVICE

RELATIONSHIP TO CO-PENDING APPLICATION

This application is a continuation of applicant's co-pending U.S. patent application Ser. No. 13/506,743 filed 14 May 2012, soon to issue as U.S. Pat. No. 8,686,943 (2014), entitled "Two-Dimensional Method and System Enabling Three-Dimensional User Interaction With a Device". This Ser. No. 13/506,743 application claimed priority to provisional patent application Ser. No. 61/518,847, filed on 13 May 2011, entitled "Low Cost System and Method for 3D Input", and was a continuation-in-part of applicant's co-pending U.S. utility patent application Ser. No. 13/385,134, filed on 3 Feb. 2012 entitled "Two-Dimensional Method and System Enabling Three-Dimensional User Interaction With a Device".

FIELD OF THE INVENTION

The invention relates generally to methods and systems enabling a user to interact with an electronic device and more specifically to enabling a user to interact in a natural manner using gestures and the like with a device in three-dimensions, using two-dimensional imaging implemented with ordinary low cost devices.

BACKGROUND OF THE INVENTION

It is useful to enable a user to interact with the display of an electronic device by touching regions of the display, for example with a user's finger or a stylus. Existing so-called touch screens may be implemented with sensors and receptors arranged to provide a virtual (x,y) grid on the device display surface. Such mechanisms can sense where on the display user-contact was made. Newer touch screens may be implemented using more advanced capacitive or resistive sensing, or acoustic wave sensing to provide better touch resolution. Some prior art displays can sense multiple user touch points and implement user commands such as zoom, pan, rotate, etc. However these known systems require placing a sense layer over the typically LCD layer.

Understandably the cost of the resultant system will increase with increases in the display size, i.e., the LCD layer. Retrofitting touch sensing to an existing device LCD can be difficult, if not impossible.

Rather than use touch sensing, camera-based optical sensing can be used to implement a two-dimensional planar touch screen system. Using an LCD screen as an example, a camera and an optical emitter, perhaps an IR LED, are disposed at each upper corner region of the screen with (x,y) fields of view (FOV) that ideally encompass all of the screen, i.e., 90° FOV in a perfect system. The emissions from the two optical emitters and the FOVs of the two cameras ideally overlap. In the z-plane, normal to the (x,y) plane of the LCD, the FOV is very narrow. The vertical sides and the horizontal bottom of the inner surfaces of the display bezel are lined with retro-reflective strips that reflect-back energy from the two optical emitters. Understandably these retro-reflective strips add to the overall thickness and cost of the display and bezel, and typically cannot be fitted retroactively to an existing LCD.

In such systems, when the user touches a region of the LCD screen within the overlapping FOVs of the emitted optical energy and the two cameras, the user's finger (or other object) blocks or interrupts camera detection of optical energy that normally is reflected-back by the retro-reflective strips. This interruption is sensed by the two cameras as a "blob" and provides a go/no-go indication that a region (x,y) of the LCD screen surface has been touched. Any color information associated with the object that blocked reflected-back optical energy is ignored. Each camera has a sensor with a row-column array of pixels. An exemplary camera sensor array might comprise 10-20 rows×500-600 columns and provide good detection in a fairly large (x,y) plane but very narrow detection range in the z-plane. One can determine the (x,y) location of the touch on the display screen surface by combining the centroid of the blob using triangulation providing information is present from both cameras. Thus, a user interaction involving two fingers $(x_1,y_1)$, $(x_2,y_2)$ will not be properly sensed if one finger (or object) occludes the other finger. Note that such systems do not detect any information in a three-dimensional hovering region spaced-apart from the display screen surface, i.e., z>0. Thus any gesture(s) attempted by the user prior to actually touching the screen surface do not result in useful detection information or interaction.

In many systems it is desirable to allow the user to interact with a display, both in a three-dimensional hover region that is spaced-apart from the display surface (z>0) as well as on the (x,y) surface of the display screen. So-called time-of-flight (TOF) systems can implement such true three-dimensional sensing, and many U.S. patents for TOF systems have been awarded to Canesta, Inc., formerly of Sunnyvale, Calif. Such TOF systems emit active optical energy and determine distance (x,y,z) to a target by counting how long it takes for reflected-back emitted optical energy to be sensed, or by examining phase shift in the reflected-back emitted optical energy. The TOF sensor is an array of pixels, each of which produces a depth (z) signal and a brightness signal for the imaged scene. The pixel array density will be relatively low, in the QVGA or VGA class, yet the silicon size will be rather large because a typical TOF pixel is many times larger than a typical RGB camera pixel. TOF systems acquire true three-dimensional data and triangulation is not needed to detect an (x,y,z) location of an object on the surface of a display (x,y,0) or in a three-dimensional hover region (x,y,z z>0) spaced-apart from the display surface.

Although they can provide true three-dimensional (x,y,z) data, TOF systems can be relatively expensive to implement and can require substantial operating power. Environmental factors such as high ambient light, system temperature, pixel blooming, electronic noise, and signal saturation can all affect the accuracy of the acquired (x,y,z) data. Operational overhead associated with acquiring three-dimensional data can be high for a touchscreen hovering application. Identifying a user's finger in an (x,y,z) hover zone for purposes of recognizing a gesture need only require identifying perhaps ten points on the finger. But a TOF system cannot simply provide three-dimensional data for ten points but must instead image the entire user's hand. If in the TOF system the pixel array comprises say 10,000 pixels, then the cost of acquiring 10,000 three-dimensional data points must be borne, even though only perhaps ten data points (0.1% of the acquired data) need be used to identify (x,y,z), and (x,y,0) information.

So-called structured-light systems are an alternative to TOF systems. Structured-light systems can be employed to obtain a three-dimensional cloud of data for use in detecting a user's hovering interactions with a display screen. A structured light system projects a stored, known, calibrated light pattern of spots on the target, e.g., the display surface. As the user's hand or object approaches the display surface some of the projected spots will fall on and be distorted by the nonplanar hand or object. Software algorithms can compare the internally stored known calibrated light pattern of spots with the sensed pattern of spots on the user's hand to calculate an offset. The comparison can produce a three-dimensional cloud of the hover zone that is spaced-apart from the display surface. A group of pixels is used to produce a single depth pixel, which results in low x-y resolution. Unfortunately structured light solutions require special components and an active light source, and can be expensive to produce and require substantial operating power. Furthermore, these systems require a large form factor, and exhibit high latency, poor far depth resolution, and unreliable acquired close distance depth data as a function of pattern projector and lens architecture. Other system shortcomings include pattern washout under strong ambient light, a need for temperature management, difficulty with sloped object surfaces, severe shadowing, and low field of view.

Common to many prior art hover detection systems is the need to determine and calculate (x,y,z) locations for thousands, or tens of thousands, or many hundreds of thousands of points. For example, a stereo-camera or TOF prior art system using a VGA-class sensor would acquire (640.480) or 307,200 (x,y) pixel locations from which such systems might produce perhaps 80,000 to 300,000 (x,y,z) location points. If a high definition (HD-class) sensor were used, there would be (1280.720) or 921,600 (x,y) pixel locations to cope with. Further, stereoscopic cameras produce a poor quality three-dimensional data cloud, particularly in regions of the scene where there is no texture, or a repetitive pattern, e.g., a user wearing a striped shirt. The resultant three-dimensional data cloud will have missing data, which makes it increasingly difficult for detection software to find objects of interest. As noted above, the overhead cost of producing three-dimensional data for every pixel in the acquired images is immense. The computational overhead and data throughput requirements associated with such large quantity of calculations can be quite substantial. Further special hardware including ASICs may be required to handle such massive computations.

Occlusion remains a problem with the various prior art systems used to implement natural user interface applications with single optical axis three-dimensional data acquisition cameras. Occlusion occurs when a part of the scene cannot be seen by the camera sensor. In TOF systems and in structured light systems, depth (x,y,z) calculations can only be performed on regions of the scene visible to both the actively emitted optical energy and to the camera sensor. Occluded objects can be less troublesome for systems that employ multiple cameras as the scene is simultaneously viewed from multiple different vantage points. In general, traditional multi-camera systems including those employing a base line also have problems producing a three-dimensional cloud of data efficiently, especially when the imaged scene includes repeated patterns, is texture-free, or has surface reflections.

Regardless of its implementation, a system to detect user interaction with the surface of a display screen and with the adjacent three-dimensional hover region must meet industry specifications to be commercially viable. For example Microsoft© Corp. Windows© 7 touch WQHL qualification for a touch application requires accuracy of an initial user touch to be within 2.5 mm of the displayed target. Further, line drawing accuracy must remain within a 2.5 mm boundary of a guide line with line jitter less than 0.5 mm in a 10 mm interval. Presently, there is no minimal requirement for the accuracy and jitter of a pointer object, e.g., a user's finger, in the hover region.

What is needed is a method and system to sense user interaction in a three-dimensional hover zone adjacent to the surface of the display on a monitor, as well as optionally sensing user-interaction with the monitor display surface itself. The system preferably should meet industry accuracy and resolution standards without incurring the cost, large form factor, and power consumption associated with current commercial devices that acquire three-dimensional data. Such method and system should function without specialized components, and should acquire data from at least two vantage points using inexpensive ordinary imaging cameras without incurring the performance cost and limitations, and failure modes of current commercial multi-view optical systems. Computationally, such system should expend resource to determine and reconstruct (x,y,z) data points only for those relatively few landmark points relevant to the application at hand, without incurring the overhead and cost to produce a three-dimensional cloud. Preferably such system should be compatible with existing imaging applications such as digital photography, video capture, and three-dimension capture. Preferably such system should be useable with display sizes ranging from cell phone display to tablet display to large TV displays. Preferably such system should provide gesture recognition in a hover zone that can be quite close to a display screen surface, or may be many feet away. Preferably such system should have the option to be retrofittably installed in an existing display system.

The present invention provides such systems and methods for implementing such systems.

SUMMARY OF THE PRESENT INVENTION

The present invention enables a user to interact with gestures in a natural way with image(s) displayed on the surface of a monitor whose display contents are governed by an appliance, perhaps a PC, a smart phone, a projector if the monitor is a whiteboard, etc. In some embodiments, the present invention includes the display as well as the appliance, in a single package. User interaction is not confined to touching the physical surface of the display but includes gestures that may occur within a three-dimensional hover zone spaced apart from the display surface. Advantageously the present invention enables a cross-section of the three-dimensional hover zone parallel to a plane of the display to be greater than the transverse dimension of the display. This permits enabling user interaction with an appliance whose display size may be small, e.g., a few cm diagonally, or large, e.g., an entertainment room TV. Indeed low cost, low form factor, and low power consumption enable fabricating embodiments of the present invention into small hand-held devices such as smart phones, whose small screens serve as the display screen.

The present invention includes at least two generic off-the-shelf two-dimensional cameras that preferably are pre-calibrated, and an electronic system including a processor and software coupled to the cameras. The system is coupled to a display and to an appliance, which appliance can in fact provide the processor and software. In some embodiments, the present invention provides the cameras, electronic system, device and display as a single unit.

The two cameras are functionally coupled in a grid, to substantially simultaneously capture from their respective vantage points two-dimensional images of the user or user object within a three-dimensional hover zone. Camera image information can be signal processed individually and collectively. The camera sensors detect RGB, monochrome, or even IR spectral energy, but need not be identical in terms of resolution and fields of view, or even spectral sensitivity. The hover zone is the three-dimensional space defined by the intersection of the three-dimensional fields of view (FOVs) of the cameras. Preferably the cameras are disposed at a small vergence angle relative to each other to define a desirable hover zone, preferably to provide maximum volume hover zone coverage at a given distance to the monitor display surface. Preferably the cameras are calibrated and modeled to have characteristics of pinhole cameras. So doing enables application of epipolar geometric analysis to facilitate more rapid disambiguation among potential landmark points during three-dimensional reconstruction. Preferably image rectification is employed to make epipolar lines parallel to an axis of the camera image planes. Finding correspondence between landmark image points acquired by the first camera and landmark image points acquired by the second camera is facilitated by looking at an epipolar lines drawn through landmark points in the first image plane to find candidate landmark points on or adjacent the epipolar line in the second image plane. Preferably only those points in the second image plane on or adjacent the epipolar line are deemed disambiguated, and processed in three-dimensions. Other points are discarded. Consequently processing overhead is substantially reduced, as is latency time.

Aggregated frames of two dimensional information acquired by the cameras of the user or user object in the hover zone and/or on the display surface are communicated at a frame rate for processing by an electronic system. This two-dimensional information is signal processed by an electronic system to identify potential landmark points representing the imaged object(s). In essence the imaged user or user object is skeletonized for representation by a relatively small number of landmark points, certainly fewer than about one hundred potential landmarks, and perhaps only a dozen or so landmarks. Signal processing then yields three-dimensional (x,y,z) data for these landmark points defined on the imagery acquired from the user, to the exclusion of having to determine three-dimensional locations for non-landmark points. In this fashion the present invention can operate rapidly using inexpensive components to yield three-dimensional reconstruction of relevant landmark points. Gesture recognition may be fed back to the appliance to alter the displayed imagery accordingly. In most applications the cameras acquire such data using ambient light, although the present invention can include an active light source, whose spectral content in suitable for the camera sensors, for use in dimly illuminated environments.

Calculating (x,y,z) locations for a relatively few landmark points, fewer than about one hundred potential landmarks and perhaps as few as a dozen or so landmark points, according to the present invention is clearly more readily carried out than having to calculate perhaps 120,000 (x,y,z) locations according to the prior art. Indeed, calculating 12 or so (x,y,z) locations versus 120,000 (x,y,z) locations per the prior art is a savings of about 99.99% in favor of the present invention. The electronic system includes software and at least one algorithm that recognizes user gesture(s) from the (x,y,z) data created from the two-dimensional camera image data.

The perhaps one hundred potential landmarks, or more typically the dozen or so exemplary landmark points defined by the present invention can be the fingertips, centroids of the user's hand(s), approximate centroid of the user's head, elbow joint locations, shoulder joint locations, etc. From the invention's standpoint the user is definable as a stick-figure having a relatively small number of landmark points. Thus, the cameras' two-dimensional image data is signal processed to create very sparse three-dimensional information, e.g., perhaps 0.01% or so of the potential number of (x,y,z) points on the user or user object, generally well under 1% of the potential number of (x,y,z) points. As such, the three-dimensional information need only be the relatively minimal (x,y,z) positional information for those landmark points needed to identify a stick-figure outline of the user (or user object), and to recognize any user gesture(s) made within the three-dimensional hover zone. In the present invention, this stick-figure analogy is arrived at using minimal potential three-dimensional data, e.g., perhaps 0.01%, as contrasted with prior art approaches that produces and processes some 99% or more of the potential three-dimensional data. In the present invention, the use of a minimal number of (x,y,z) landmark points, generally potentially one hundred or less, and typically perhaps a dozen or so landmarks, is sufficient information needed by a companion software routine or application to implement higher level functions such as user body pose tracking and gesture interpretation.

The electronic system includes a processor unit that acquires the two-dimensional data from each camera, signal processes the acquired two-dimensional images to recognize therein and reconstruct a relatively few landmark points (x,y,z) within the three-dimensional hover zone as will suffice to identify user gesture(s). Advantageously the use of at least two conventional cameras to substantially simultaneously image the user or user object(s) from their respective vantage points enables signal processing to create the relatively small set of three-dimensional (x,y,z) landmark data points. These landmark points are essentially created on demand as needed, for example fingertip landmark points for a hand, head landmark points for a head, etc. The processor unit communicates with the application driving the imagery presented on the display screen, and enables the user to interact in a natural manner with such imagery. For example, a user might play a virtual game of tennis against an image of a tennis player on the screen serving a tennis ball to the user.

An algorithm within the processor unit extracts objects of interest, e.g., hands, fingers, user head orientation, in each image acquired by the cameras, to interpret the user's intent in make a gesture. Landmarks, previously defined by the software, are identified in the objects, e.g., fingertips, finger axis, user pose. This landmark information from the various cameras is combined to locate the landmarks on the user in real world coordinates $(x_w, y_w, z_w)$ The processor unit interprets three-dimensional information including motion, location, connection and inter-relationship properties of the landmarks to create events, e.g., move the displayed image in a certain fashion. The created events are coupled to at least one companion system, e.g., a digital computer, tablet, smart phone, set top box, TV, etc. Optionally shapes and location properties of at least some landmarks can be interpreted and coupled to drive immersion applications in social networks, and entertainment devices, with optional feedback provided to the user based upon such commands and immersion application.

Other features and advantages of the invention will appear from the following description in which the preferred embodiments have been set forth in detail, in conjunction with their accompanying drawings

BRIEF DESCRIPTION OF THE DRAWINGS

FIG. 1A-1 is a block diagram of an exemplary camera, according to embodiments of the present invention;

FIG. 1D-1 is a front view of FIG. 1A, with a variable camera displacement option, according to embodiments of the present invention;

FIG. 1D-2 is a front view similar to FIG. 1D-1 except cameras 80-1, 80-2 are disposed away from the monitor, according to embodiments of the present invention;

FIG. 4B-FIG. 4G depict use of epipolar-line camera system geometric properties to disambiguate multiple corresponding potential landmark candidates, according to embodiments of the present invention;

FIG. 7A depicts the many process steps and associated high bandwidth data rate requirements associated with three dimensional sensing methods according to the prior art;

FIG. 7B depicts the relatively fewer process steps and associated low bandwidth data rates to acquire three-dimensional coordinates for a relatively few landmark points, according to embodiments of the present invention; and FIGS. 8A-8K depict latency improvements provided by embodiments of the present invention.

DETAILED DESCRIPTION OF THE PREFERRED EMBODIMENTS

Figure 1A:
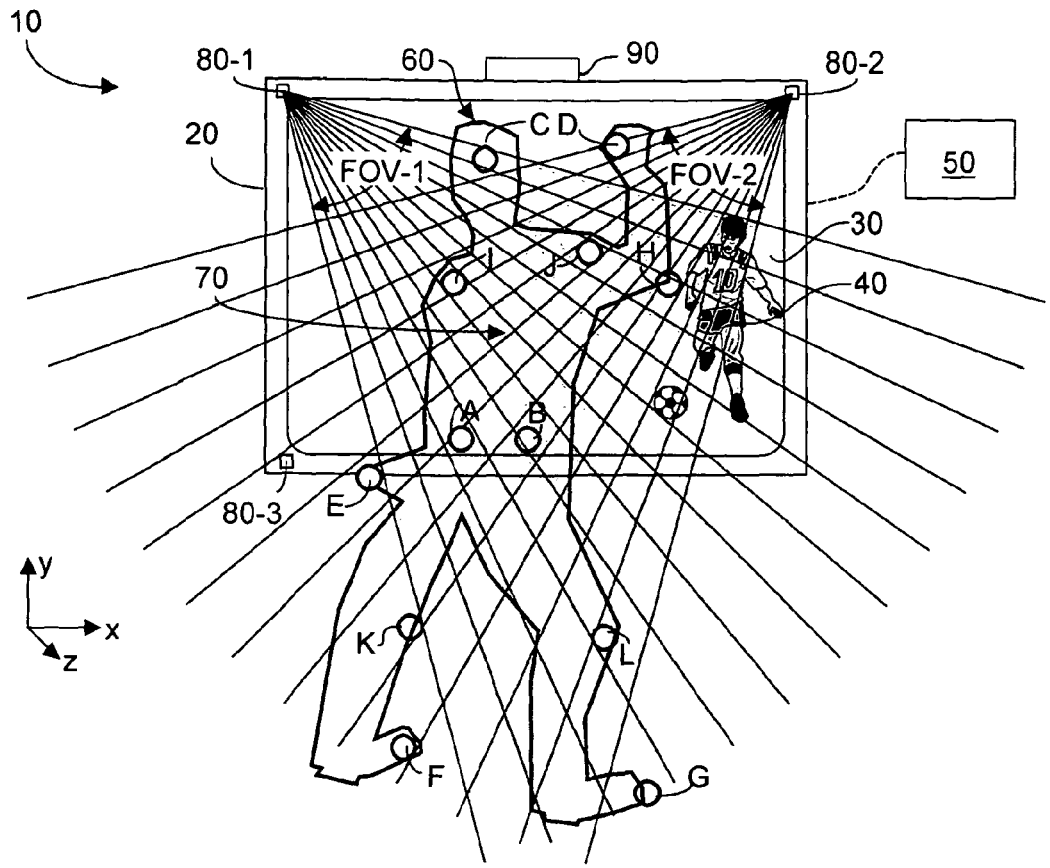
FIG. 1A is a front view of an embodiment of the present invention.

It is useful to review aspects of the priority Ser. No. 13/385,134 application (the '134 application) at this juncture. FIG. 1A is a front view of an embodiment of a system 10, according to the '134 application and to the present invention. In overview, system 10 includes a functional grid at least two cameras 80-1, 80-2, etc. disposed relative to a monitor or display 20 so as to image in two-dimensions interaction by a user or user object 60 with imagery 40 presented on the display surface 30. As used herein the terms "user" and "user object", will be understood to include user 60, portions of user 60, perhaps a hand, a finger, a fingertip, as well as any object held by the user used in gesturing, perhaps a passive stylus or wand. The various cameras can operate cooperatively and independently albeit substantially simultaneously, as described herein under command of an electronic unit 90. Electronic unit 90 in system 10 processes two-dimensional frames of image data captured substantially simultaneously by each camera from that camera's vantage point and provided to electronic unit 90 at a known frame rate. Software associated with electronic unit 90 intelligently creates three-dimensional image data not for the entire imaged scene, but for the relatively few potential landmark points such as A, B, C, D, etc. associated with the user. As few as a dozen or so landmark points can be sufficient to enable gesture recognition according to embodiments of the present invention. These landmarks provide semantic clues in that the landmark points are identifiable objects, e.g., portions of a user's body such as fingertip, elbow, head, etc., that are relevant to successful implementation of natural user interfaces. Electronics 90 can identify and determine the user gesture, which can be made right at the display screen surface 30 (x,y,0) and/or in a three-dimensional hover zone 70 (x,y,z) spaced apart from surface 30. Electronics 90 can provide information to a host system 50 to cause what is being displayed 40 on monitor 20 to respond appropriately to the user gesture.

More specifically, in FIG. 1A, system 10 is shown in use with a monitor 20 upon whose screen surface 30 an image 40 is displayed, here a soccer player and a soccer ball. Location points on surface 30 may be denoted (x,y,0), where in FIG. 1A, the x-axis extends left to right, the y-axis extends bottom to top, and the z-axis extends outward from the x-y plane of screen surface 30. Imagery such as 40 displayed on monitor 20 may be commanded by an appliance 50 coupled (via wire or wirelessly) to the monitor and will generally be dynamic, rather than static. Host system 50 typically includes at least one processor, memory, and among other tasks can respond to system 10 interpreted user gestures and/or user events to alter what imagery 40 displayed on monitor 20. Without limitation appliance 50 may include a computer, a smart phone, a tablet, a laptop, an e-book reader, a set top box, a smart TV, etc. and indeed in some embodiments appliance 50 may be fabricated within monitor 20 and collectively define an appliance or device. It is understood that in some applications device 50 could respond to recognized user gesture(s) by issuing audible sounds and/or by altering what is displayed on monitor 20. Device 50 could respond to recognized user gesture(s) by altering at least one device characteristic, e.g., device 50 audible volume may be changed, on-off device state of device 50 may be changed. In some embodiments recognized user gesture(s) might alter a system characteristic, e.g., causing controlled tilting and orientation changes in cameras 80-1, 80-2 by causing servo mechanisms associated with the camera mounting, e.g., member 95, to alter orientation of the cameras as desired by a user. Indeed, in some embodiments monitor 20 may be replaced by other interaction type surfaces, e.g., a whiteboard or even a wall surface upon which an application graphical user interface is projected by appliance or device 50. Cameras 80-1, 80-2, etc. would be disposed at corners of such white board or panel. In some preferred embodiments cameras 80-1, 80-2, etc. are substantially identical with respect to sensor array pixel resolution, sensor pixel wavelength sensitivity, and fields of view. However embodiments can be implemented in which the cameras are dissimilar in at least one of these characteristics.

Without loss of generality, embodiments of the present invention can be implemented using displays as small as those found on a smart phone, to displays measuring 50" or more diagonally, as found for example in home entertainment centers. User interaction in a three-dimensional hover zone can be detected and interpreted as specific gestures, by which the user intends to respond to or command an image or operation on a display monitor. At least first and second cameras are disposed, preferably at corners of the display, such that the FOV of each camera grazes the monitor display surface and the field of view above it. Distance and orientation of the cameras with respect to each other and the monitor display screen are assumed to remain fixed within certain tolerances for the life of the product. Understandably slight movements can be calibrated by the user or with auto-calibration methods.

One function of the present invention is to enable at least one region of an object 60, here a human facing the display, to user-interact with images 30 displayed on monitor 20. Such interaction can occur not merely at the screen surface, e.g., (x,y,0) of monitor 20, but within a three-dimensional hover zone 70, e.g., (x,y,z) that is spaced-apart from the screen surface. System 10 further includes at least two cameras 80-1, 80-2, etc. functionally coupled together in a camera grid to capture substantially simultaneously from each camera's vantage point an image of a user 60. Three-dimensional hover zone 70 is shaded in gray for ease of understanding. User gestures and the like made within hover zone 70 can be captured for the purposes of reconstruction in three-dimensions, according to the present invention.

One advantage of the present invention is that in many embodiments a cross-section size of the hover zone taken parallel to the display surface may easily exceed the diagonal size of the display screen. This is an especially useful aspect of the present invention, especially when used with small display screens found on smart phones, tablets, etc. Without limitation, gestures or other user action made on the display screen surface or more generally within three-dimensional hover zone 70 may include touching a region of the screen surface and then moving head, fingers, hand(s), torso, feet, etc. to command an action to be represented on the display screen. Alternatively gestures may be made solely in hover zone 70, or may begin in hover zone 70 and end with a touching of the display screen surface. As described later herein, gestures may be translated by the present invention to high level parameterized digital command code, e.g., move the displayed soccer ball from here to there. Multiple gestures can be sensed and implemented as commands including without limitation zoom, pan, rotate, move, etc. a displayed image, e.g., 40, presented on monitor 20. A gesture may also be captured in a raw format that best describes the location and motion of user landmark(s), described below. As described later herein, the present invention is quite flexible in determining at what processing state a raw data capture should be interpreted as a high level command. High level commands or raw representations may be described with a series of event names, event identification, and optionally associated with information such as three-dimensional locations, angles, and velocity. This information can be passed to a proxy or host system or sub-system appliance that is associated with or represents the display screen surface. For example in some embodiments, the display screen is an LCD and the proxy digital system or appliance 50 may include a PC, a tablet PC, a smart phone, an e-book reader, a set top box, a TV, etc.

Referring still to FIG. 1A, user 60 may "play" a virtual game of soccer against opponent(s) 40 that are displayed on monitor 20. If the soccer player image displayed on the monitor screen kicks the soccer ball image, user 60 may head butt or chest block or kick the virtual ball, using the user's body. If such user interaction occurs within the three-dimensional hover zone, the present invention can locate in three-dimensions landmark points definable on the user, and interpret user gestures or other actions. (If the user or user portion is not within the hover zone, the user will not see any interaction displayed on the monitor.) In the present example, the thus "returned" ball will be appropriately displayed on monitor 20 and displayed player(s) 40 will take appropriate action to prevent user 60 from scoring a goal. Feedback occurs in the sense that the displayed image might now show the soccer ball in a new position, whereupon the user will use a gesture to return the soccer ball, whereupon the displayed image shows the trajectory and new position of the soccer ball on the soccer field, etc. This is but one example of how system 10 can implement an interactive engagement between user 60 and activity dynamically displayed on monitor 20. In contrast to expensive and physically bulky and power hungry prior art techniques, the present invention enables such interaction with inexpensive, tiny devices that consume minimal operating power (see Table 1). Further such interaction is provided using inexpensive two-dimensional cameras whose acquired image data is relatively minimally processed to yield two-dimensional landmark data from which selective three-dimensional data is generated for the relatively minimal landmark data. In other situations the user may use embodiments of the present invention to interact with physical objects in the vicinity, perhaps the same room. For example the user might point toward the ceiling, which pointing would be sensed by embodiments of the present invention and be recognized as a natural user interface gesture command to toggle the room lighting on or off, or perhaps make the room lighting brighter or dimmer. In some applications objects displayed on monitor 20 might include an image of the room in which the user is present. The user could point toward displayed room objects, perhaps the ceiling lighting, to cause the lighting to turn on or off, become brighter or dimmer, etc., using natural user interface gestures. In another situation, perhaps a map object is displayed on monitor 20. The user could point toward a region of the map object, which pointing would be sensed by embodiments of the present invention and recognized as a natural user gesture to zoom in or zoom out from the pointed-to map region. Understandably the field of application with which embodiments of the present invention may be used is quite broad.

Table 1 below tabulates differences in various features between embodiments of the present invention and various prior art approaches to providing gesture recognition. In Table 1, the 1 cm³ volume represents two cameras and electronics used to implement the present invention. The 1 mm accuracy for the present invention is achievable because there is minimal electronic noise. Such noise is minimal primarily because the present invention is intensity and image processing based.

TABLE 1

| FEATURE | PRESENT INVENTION. | TOF | STRUCTURED LIGHT |
|---|---|---|---|
| COST | Low, <$3 | High, >$50 | High, >$40 |
| POWER/HEAT | Low, <0.5 W | High, >5 W (fan or heat-sink needed) | High, >10 W (fan or heatsink needed) |
| SIZE (approx) | Tiny, 1 cm³ | Large, 90 cm³ | Large, 108 cm³ |
| NEED CUSTOM PARTS? | No | Yes: sensor, light source, ASIC | Yes: light source, filter, ASIC |
| ACCURACY AT 0.3M | ≈1 mm | >1 cm | probably >1 cm |

As shown in FIG. 1A, system 10 includes at least two cameras 80-1, 80-2, etc. functionally coupled together in a camera grid to capture substantially simultaneously from its vantage point an image of a user. Each camera substantially simultaneously produces and then substantially simultaneously transmits a frame of acquired data at a predetermined frame rate of preferably about 30 frames/sec. to about 60 frames/sec to capture rapid motions of object 60. If system 10 and cameras 80-1, 80-2, etc. were perfect, each camera would begin to take an exposure simultaneously and each camera were end exposure simultaneously. But in practice, neither the cameras nor system 10 work absolutely perfectly. In practice, for a camera exposure of about 8 ms duration, tolerance on the start and end of exposure should be within about ±1 ms. For a longer exposure, a bit more leeway is acceptable and for a 16 ms duration exposure, tolerance on the start and end of exposure should be within about ±1.5 ms. With this in mind, the term 'substantially simultaneously' as used herein means within about ±1.5 ms or less, or about ±10% of camera exposure duration or less. In general cameras suitable for use with the present invention can readily synchronize exposures relative to each other in sub-millisecond time. For example a fast hand motion gesture is about 100 cm/sec. Thus, in 1 ms the hand moves around 1 mm, which is within the tolerances of natural interfaces. Each camera then substantially simultaneously repeats these operations, governed by the frame rate. Each camera 80-1, 80-2, etc. has a respective three-dimensional field of view FOV-1, FOV-2., etc. An optional third camera 80-3 is shown, but its FOV-3 is not depicted to avoid cluttering FIG. 1A. Cameras 80-1, 80-2, etc. preferably are inexpensive two-dimensional cameras that capture at least one of color (RGB), monochrome, and infrared (IR) spectra. FOVs are depicted in FIGS. 1A-1I as cones of rays drawn as straight lines that converge at each camera's lens.

In practice, many embodiments of the present invention were constructed using commercially available OmniVision model OV7740 VGA cameras; see www.ovt.com. This commercially available camera has FOV-H≈50° and FOV-V≈40°. While these relatively narrow FOVs were less than ideal, these cameras nonetheless performed adequately for gesture sensing according to the present invention. In high quantity, unit price of similar cameras is currently less than $1.

Figures 1, 1A:
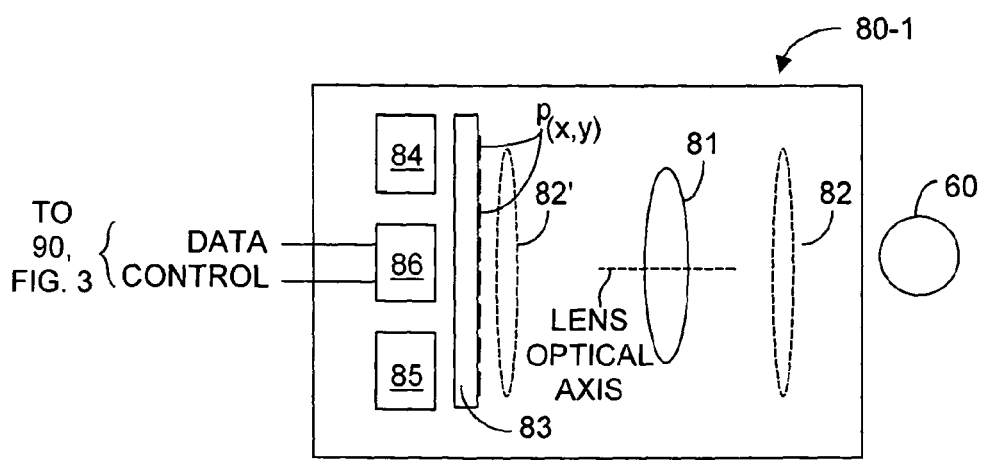

As best seen in FIG. 1A-1, each camera 80-1, 80-2, etc. includes a shutterable lens 81, an optional filter 82, a planar array 83 of sensor pixels $p_{(x,y)}$ arranged in rows and columns, optional processor 84, optional memory 85, and control and communication circuitry 86. The number of rows and columns of pixels $p_{(x,y)}$ in array 83 is determined by the applications for which system 10 is to be used, and details as to determining relevant pixel density is described later herein. Typical array 83 is fabricated using CCD or CMOS processes. Data and control lines synchronously operate the camera shown, e.g., 80-1, in conjunction with other cameras, e.g., 80-2, etc., in the camera grid, under control of electronics 90 shown and described later herein with respect to FIG. 1A and FIG. 3. User 60 is depicted in FIG. 1A solely to give the reader a sense of the orientation of the components comprising exemplary camera 80-1. If cameras 80-1, 80-2, etc. are RGB, preferably integrated color filters are employed, arranged in a so-called Bayer pattern over the pixels.

Information is needed respect to cameras 80-1, 80-2, etc. concerning their intrinsic (or geometric) parameters, their extrinsic system parameters, and their registration with respect to system 10. In practice this information is acquired during one or more calibration steps. Initially the intrinsic or geometric parameters of each camera will have been determined, and include camera lens focal length, horizontal and vertical pitch of pixels p(x,y) in array 83, FOV-H, FOV-V, and optical distortion parameters $k_i$. For purposes of intrinsic calibration, each camera may be considered a ray-based optics that projects rays of incoming light to its pixels. FIGS. 1A-1E show rays, drawn with straight lines, that converge on each camera's lens and thence to the camera's pixel array; collectively these rays define that camera's FOV. Intrinsic calibration determines the correct mapping between the rays and pixels in the camera's sensor array. Thus, once calibrated, for a given camera the forward projection from a ray of light to a pixel, and a backward projection from a pixel to the ray of light are known. After the cameras are fixedly mounted to system 10, extrinsic system calibration determines each camera's properties, i.e., the two-dimensional pixel coordinates $p_{(x,y)}$ of each camera's sensor array 83, with respect to the outside world, including each camera's rotation and translation matrices, respectively R and T, with respect to the external world common coordinate system $(x_w, y_w, z_w)$ associated with system 10; see FIG. 4A. Such a priori knowledge of the collective geometric properties of the cameras 80-1, 80-2, etc. and system 10 can be used to locate landmark positions for objects 60 in three-dimensional hover zone 70 space.

Many calibration methods are known in the art, e.g., "Flexible Camera Calibration by Viewing a Plan from Unknown Orientations", Zhengyou Zhang, Microsoft Research, Redmond, Wash. 98052. Preferably calibration does not require knowledge of the camera orientation, and starts by defining a camera reference system that need not be accessible external to the camera. That is, one cannot readily measure location of a real world object with respect to that reference coordinates until calibration is completed and the camera is registered to an external world coordinates. However, this approach is used as a convenient mathematical concept to derive camera calibration parameters. What can be determined is the (sub) pixel location of an external landmark (like a corner of a checkerboard) in the camera pixel sensor image plane. Accordingly, patterns are imaged during calibration whose landmarks are well defined with respect to each other and are preferably situated on the same plane. Such camera calibration preferably involves the following steps. First a visible pattern is defined on a plane surface, perhaps a repeated pattern such as a black and white checkerboard. The location of pattern landmarks (e.g., corner points on the checkerboard) is measured precisely with respect to a known position on the pattern. The pattern is maintained steadily to fill the camera's FOV, and an image is captured by the camera. Corner milestones in the pattern are identified with sub-pixel resolution in the camera pixel sensor image plane. Calibration precision is enhanced by repeating this measurement several times, with different pattern images. Correspondences are input between the landmarks and their respective (sub)pixel locations in the image plane to a cost-minimizing calibration algorithm that is executed. The algorithm results are extracted and are stored as the camera's intrinsic parameters for the camera.

In practice, calibrating camera intrinsic and extrinsic properties are typically done once in the lifetime of the camera. Assuming that there are no significant positional shifts inside the camera, between mounted cameras relative to each other and to the monitor display surface, acquired calibration data should be applicable during the life of the product. One might, however, develop procedures to regenerate such data after the camera has been mass produced. Gathering and storing the various calibration information is preferably done during manufacture of the cameras and/or system 10, by the manufacturer.

Calibration precision is a function of how well calibration mapping can be estimated, and in practice the care in performing a good calibration should be commensurate with the precision requirements of the application. A precise calibration, i.e., on the order of millimeters or sub-millimeters, is appropriate for metrology application such as touch sensing.

A more coarse calibration can suffice for applications that work in large volumes, e.g., gestural interfaces and immersive entertainment.

During normal system 10 runtime, data processing occurs as images are acquired and as data is aggregated from the multiple cameras 80-1, 80-2, etc. in the camera grid. The a priori determined and stored camera and system calibration parameters are used by electronics 90 during runtime to correct for errors including camera distortion. Such correction allows the cameras to be regarded as ideal cameras, e.g., pinhole cameras, and then using extrinsic parameters, e.g., R and T parameters, to correctly reconstruct three-dimensional $(x_w, y_w, z_w)$ positional coordinates for any landmark acquired by the system relative to a system-mounted camera, e.g., 80-1, and relative to the global coordinate system, e.g., relative to a fixed reference, perhaps a point on the wall wherein the system is located, or a point on one of the cameras, a point on monitor 20, a point on device 50, etc.

Understandably from a system 10 design point of view it can be advantageous to carry out any invariant, time consuming computations during camera or system 10 production time. So doing reduces run-time computation load for system 10.

In FIG. 1A, although cameras 80-1, 80-2 are depicted as spaced-apart along the x-axis, they could of course be spaced-apart along the y-axis, e.g., 80-1, 80-3. Cameras 80-1, 80-2, etc. are rigidly affixed to the display screen bezel (if present) of monitor 20, or affixed to or on or even behind any protective sheet of glass that typically structurally helps support the display. Exemplary spaced-apart camera base distances might by on the order of perhaps 6 cm for close-up user interaction within perhaps a one meter range. For longer user interaction ranges of perhaps 3 m to perhaps 4 m, the spaced-apart base distance between the cameras might be about 6 cm to about 20 cm. These exemplary base and range distances are also affected by factors including camera resolution, the precision requirement for the application at hand, and whether the display output involves three-dimensional user viewing. Each camera employed in system 10 captures its image substantially simultaneously with the other cameras, preferably within about ±1 ms. Motion blur in acquired images is reduced by operating each camera 80-1, 80-2 at a maximum gain, with commensurate shutter times, e.g., about 5 ms to about 10 ms. System 10 can sense object region(s) such as landmarks only if the object region(s) appear within three-dimensional hover zone 70, defined by the common intersection of the two FOVs, as well as the intersection of ambient light. In FIG. 1A, some regions of user 60 fall within the intersected region of FOV-1 and FOV-2 and may be properly imaged by cameras 80-1, 80-2, e.g., much of the torso and both arms, nearly all of the head, and much of the right leg. It is understood that cameras 80-1, 80-2, etc. preferably include swivel mounts such that the camera's FOV may be aimed to provide a desired hover zone 70. For example monitor 20 may be moved from a table top and mounted to a wall, in which case the swivel mounted cameras are readily aimed to provide the desired hover zone 70. (The role of landmark points such as A, B, C, D, etc. definable on the monitor-facing region of object 60 is described later herein.) System 10 includes an electronic system 90 with a processor unit that provides the functionality needed to implement the present invention. Indeed, in some embodiments system 10 may encompass device 50, monitor 20, and electronic system 90 in a single package.

Cameras 80-1, 80-2, etc. preferably have relatively high resolution RGB (color), or gray-scale sensors, and may even have an IR sensor. Each camera will have a sensor array of pixels, where sensor array pixel density depends upon several factors including the requirement of the final application. For example, for a gesture application involving pointing with a user finger, the number of vertical and horizontal pixels in the array needed to detect a pointing gesture at a certain distance from the screen with one or more fingertips. The sensors pixel density specifications should also take into account the smallest object (or target) on the monitor display screen that can be user-selected with the precision required. Other factors in specifying a sensor array include the smallest movement of the pointing object that must be detected, and the FOV of the camera lens, defined in both vertical FOV-V and horizontal FOV-H dimensions. Further, the size of the image frame to be captured, transferred and processed should also be taken into account.

Consider now the design considerations in specifying the number of pixels $p_{(x,y)}$ in sensor array 83 in FIG. 1A-1 for cameras 80-1, 80-2, etc. Assume at least 6 horizontal pixels are needed to detect a finger of width 12 mm disposed approximately at the camera lens optical axis, at the diagonal corner of the display, across from the corner whereat the camera is mounted. For touch applications, the highest precision is required when the user actually touches the surface of the display screen, e.g., (x,y,0). Let the camera FOV-H be about 90° and let the display screen size be 23" (or 584.2 mm) diagonally. In this example, the furthest point on the display screen from the camera is a distance of 584.2 mm within hover zone 70. Thus, the minimum number of horizontal pixels needed by the camera sensor is about (6 pixels·2·584.2 mm)/(12 mm)=585 pixels. Of course, in the present invention, a camera can image many feet beyond the display screen surface. Thus, depending on the gesture sensing application, one should take into account the smallest objects that must detected in the extended region around and above each camera. A similar design approach is used to calculate the number of vertical pixels needed to detect objects in the hover region. As regards the number of calculated horizontal pixels when user motion is nearly perpendicular to the camera lens optical axis, From the above calculation each pixel subtends 2 mm in the furthest corner on the screen (i.e., 12 mm/6), ignoring camera distortion. Thus a finger movement of 2 mm is detectable by a system employing such a camera sensor. In practice user movements of even less than 2 mm can be detecting using sub-pixel resolution algorithms. Thus a 2 mm spatial resolution satisfies the design criteria noted above for the present application.

If user object motion is in the hover zone along the optical axis of the camera lens, it is necessary to ensure that the three-dimensional reconstruction precision of system 10 can meet the requisite system depth resolution. Assuming disparity between the sensors in the two cameras in this example, and assuming a resolution of 585 horizontal pixels, it can be shown that system depth resolution at 584 mm distance along the optical axis of a camera is 3.3 mm, without use of sub-pixel resolution. However, using a 1000×N pixel camera, depth resolution drops to 1.9 mm, which satisfies the 2 mm design criterion. The choice of N, e.g., 480, is governed by the FOV and the resolution requirement in the z direction, normal to the monitor screen.

According to embodiments of the present invention, a preferred method of carrying out dense stereoscopically acquired depth calculations is the so-called sum of squared differences (SSD) method. SSD methodology uses a window (or kernel) having a width and a height. As noted, each camera (80-1, 80-2) captures an image on the camera's image plane. Disparity relates to relative shift in location on the two image planes of a commonly imaged object. The window width may be as large as the maximum disparity between two corresponding such object image points. In practice, disparity increases when the object is close to the cameras, and decreases as the object is farther from the cameras. The window height may be as large as what system 10 calibration tolerances dictate, perhaps 10 pixels. Assume cameras 80-1, 80-2 have a spaced-apart baseline of 6 cm, and a lens 82 focal length of 1.6 mm, and assume the system should compute depth ranging from about 12 cm to infinity. This would yield a maximum disparity size for two corresponding points in each image of about (1.6 mm)·(6 cm)/(12 cm) or 0.8 mm. If pixel density or pitch on array 83 is 2 µm, then the number of pixels to be analyzed for possible correspondence matches may be up to 400 pixels. Assuming a kernel height of 10 pixels, brute force calculations for 10·400 pixels over each pixel in the first and second images acquired by cameras 80-1 and 80-2 respectively yields 1280·720·10·400, or more than 3 billion SSD calculations per frame of optical image. Admittedly producing this cloud of three-dimensional data represents a substantially huge number of calculations. Performing such large computation in real-time requires substantial processing overhead and thus creates latency, which slows the response time of system 10. Consequently the realism of a system relying upon three-dimensional data to implement natural user interface will suffer.

However as described herein, embodiments of the present invention avoid having to cope with such large amounts of data by intelligently identifying a relatively few so-called relevant landmark points in two-dimensional camera-acquired image data. As to these relatively few points three-dimensional reconstruction of locations is undertaken. The culling out of unnecessary data points reduces three-dimensional reconstruction very substantially, eliminating perhaps 99.9% of the data points.

Consider now a coarser pointing application that need operate only in hover region 70 at a distance from surface 30 of monitor 2 (see FIG. 1A) of about 3 meters to detect a user index finger landmark of 15 mm width. Assume cameras 80-1, 80-2, etc. are VGA cameras having FOV-H of 60°. Using similar analysis as above, encompassing a user fingertip will be about 2.7 pixels. For such a design center, perhaps tracking the centroid of a multiple fingers is a more preferred landmark for controlling the pointer application.

Figure 1B:
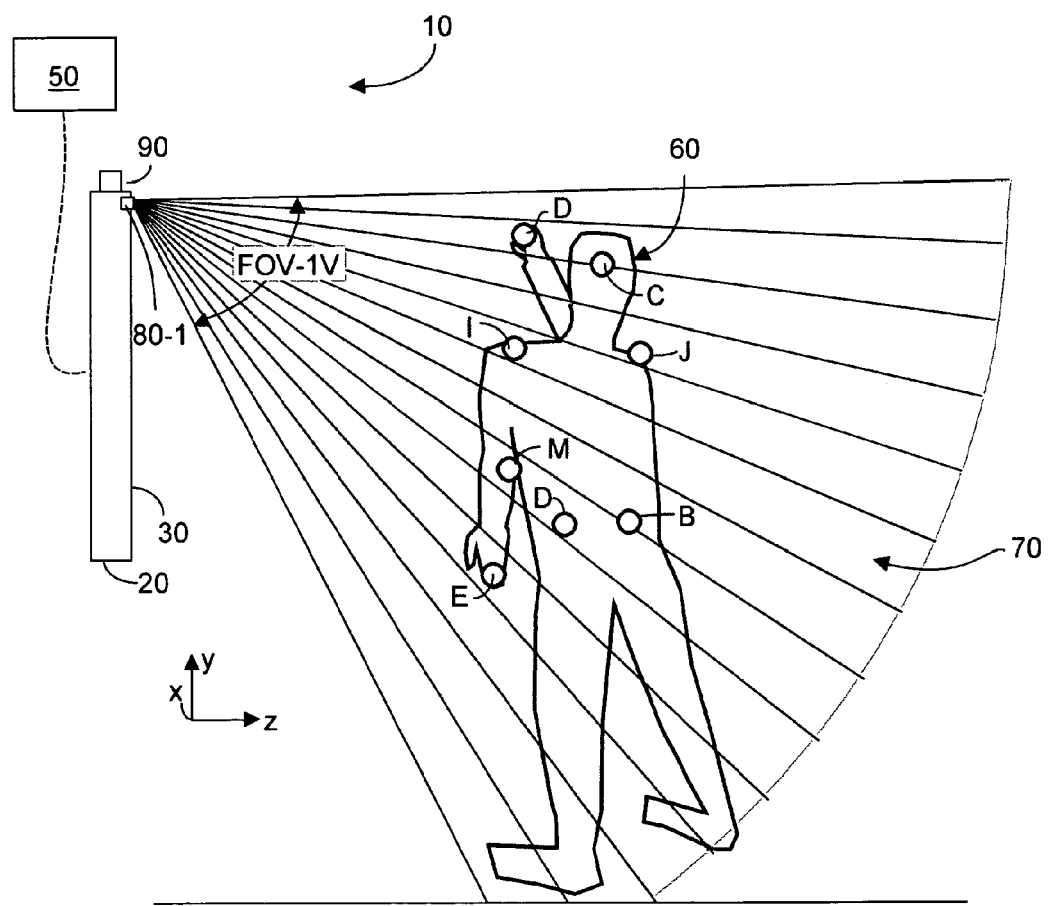
FIG. 1B is a side view of FIG. 1, according to embodiments of the present invention.

FIG. 1B is a side view of what was depicted in FIG. 1A. It is understood in FIG. 1B that the z-axis extends left-to-right, the y-axis extends upwards, and the x-axis extends into the plane of the paper upon which FIG. 1B is printed. The field of view shown is the vertical field of view (FOV-1V) for camera 80-1, which preferably has the same field of view as camera 80-2, FOV-2V, and (if present and operating) camera 80-3, etc. For cameras 80-1, 80-2, etc., used with the present invention the vertical FOV will be in a range of about 50° to about 70°, with a preferred FOV-V of about 60°.

Figure 1C:
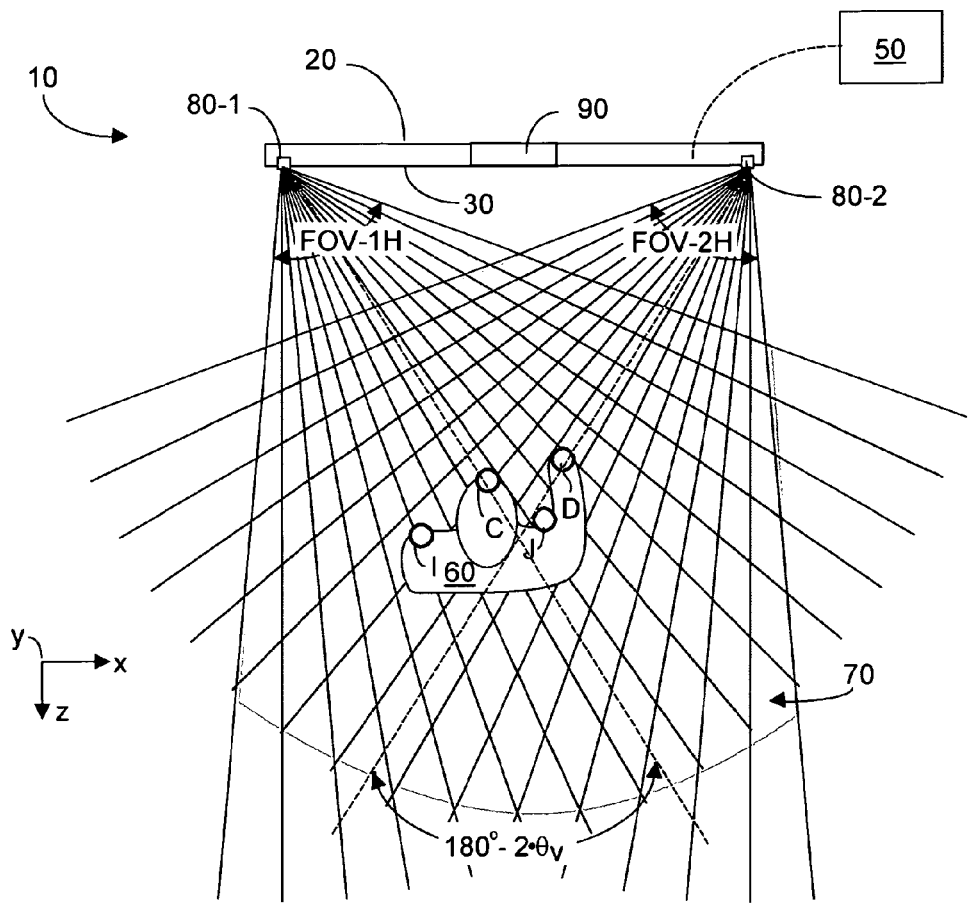
FIG. 1C is a top view of FIG. 1A, according to embodiments of the present invention.

In the top view shown in FIG. 1C, it is understood that the y-axis extends upward from the plane of the paper upon which FIG. 1C is printed. In this view the horizontal fields of view, FOV-1H, FOV-2H, etc. for the various cameras are shown, where the various horizontal FOVs are identical to each other. FIG. 1C depicts a tilting of cameras 80-1, 80-2 toward each other at a vergence angle $\theta_v$ to provide a desire hover zone. Vergence angle $\theta_v$ is defined to be the angle between the optical axis of each camera. If $\theta_v=0°$ then the cameras are disposed with their optical axes parallel to each other. In practice each camera preferably is tilted perhaps 5° or more from its optical axis toward the other camera. Note from FIG. 1C that the three-dimensional hover zone 70 is sufficiently large to enable the present invention to image multiple objects or users. Alternatively, the user's head could be deemed one object, where head tilting is a type of gesture, and the user's hand(s) are another object, where hand or finger motion defines yet further gestures.

Figures 1, 1D:
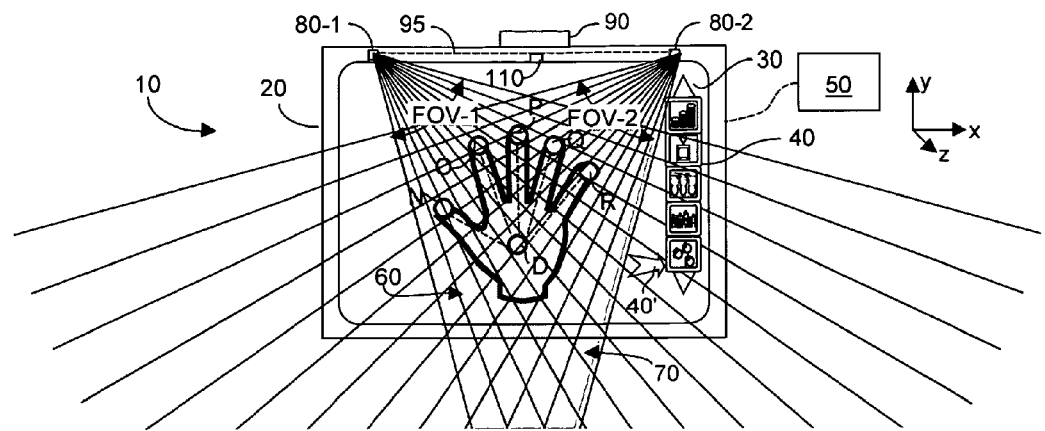

For the cameras used with the present invention, the size of horizontal fields of view (FOV-H) and the vertical fields of view (FOV-V), see FIG. 1D-1, substantially depends upon the type of the application. If the application requires capturing both touch, e.g., (x,y,0) contact with the surface 30 of monitor 20, and hover actions, then a FOV-H of about 90° and a FOV-V of about 60° is recommended. If the application need only operate in the hover zone and not also at the surface display, depending upon the width and height of the three-dimensional hover zone, FOV-H might be in a range of about 50° to about 80°, and FOV-V might be in a range of about 50° to about 70°. For a given application, each camera will have an identical fixed FOV-H, and an identical fixed FOV-V, although as noted FOV-H and FOV-V may differ from each other. Any difference between FOV-V and FOV-H for cameras 80-1, 80-2, etc. does not imply that system 10 requires camera asymmetric lenses. Each camera has a lens and a sensor array, and the sensor array can be placed slightly in-center or off-center relative to the axis of the camera lens such that cameras 80-1, 80-2, etc. with symmetrical lenses may be used. Advantageously the present invention can handle the optical distortion that is typically produced by the inexpensive lenses of cameras with wide field of view.

FIG. 1D-1 is similar to the embodiment of FIG. 1A and is likewise applicable both to the '134 application and to the present invention. However in FIG. 1D-1, system 10 includes an optional mechanism 95 that enables cameras 80-1, 80-2 to be manufactured as a composite module, and simultaneously repositioned horizontally, symmetrically with the center of the screen of monitor 20, before being secured in position. Mechanism 95 wants to be sufficiently rigid that orientation of the two cameras does not shift with respect to each other, and with respect to the monitor screen. Accuracy of the desired three-dimensional reconstruction from data in the hover zone will govern rigidity of the camera mounting. For example, if 1 mm measurement error can be tolerated in the life of the cameras at 30 cm, then tolerance upon relative flexing of the camera mounts should be less than about 0.2°.

Note in FIG. 1D-1, that cameras 80-1, 80-2 are depicted with narrower fields of view (FOV) than the cameras in FIG. 1A. However by allowing the two cameras to be repositioned closer to each other a desired size three-dimensional sensing hover region 70 can still be created. In FIG. 1D-1 object region 60 is the user's left hand, all of which is shown falling within hover region 70, defined by the overlapping portions of FOV1 and FOV2. Again, the role of landmark points such as D, N, O, P, Q, R denote definable regions on hand object 60, as viewed from the monitor-facing side of the hand or object. Dashed lines are depicted in FIG. 1D-1 between the centroid O of user object 60, here a right hand, and the landmarks of the tip of the thumb, N, and of the fingertips O, P, Q, and R. The dashed lines correspond to the axes of the thumb and fingers relative to the centroid, and depict a somewhat skeletonized representation of user object 60. As described later herein with respect to FIG. 5, software analysis of the skeletonized image acquired by cameras 80-1, 80-2, etc. enable in this example identification of user object 60 as a right hand. The software recognizes that N is the tip of a thumb since the distance between N and O is less than the distance between R and O. Thus N is the tip of a thumb, and R is the tip of a little finger. In the orientation shown, N is the tip of a right thump, and N is the tip of a little finger on the right hand.

In FIG. 1D-1, monitor 20 is shown displaying a menu ribbon 40 with various icons, and a pointer cursor 40'. Object 60, depicted here as the right hand of a user, can interact with system 10 within hover zone 70 to manipulate one or more objects 40, 40' displayed on the surface of monitor 20. For example the user's forefinger tip, denoted as landmark O, may be used to select an icon on menu ribbon 40, or to scroll the menu ribbon upward or downward. The user-desired icon may be caused to enlarge in size or to be highlighted, or the like, to indicate selection, as a function of system 10 recognizing the user gesture. In other applications, the user's hand gestures may command movement of cursor 40' so as to select an icon on menu ribbon 40, or elsewhere on the display.

In many applications, sufficient ambient light, including light from monitor 20, is present to enable cameras 80-1, 80-2, etc. to adequately image landmarks A, B, C, etc. on object(s) 60 in hover zone 70, and to reconstruct their three-dimensional position. However brightness of illumination from LCD and other display monitors can change with color changes on the imagery being displayed at any moment. In instances when inadequate light conditions exist and additional light is desirable, embodiments of system 10 may optionally include at least one active optical energy source 110 (see FIG. 1D-1). Light source 110 is shown disposed intermediate cameras 80-1, 80-2 to avoid cluttering the figure, but a preferred location would be for such light sources to be disposed as close as possible to each camera. No emissions from optical source 110 are depicted to avoid further cluttering FIG. 1D-1. Light energy emitted by optical source 110 will include spectra energy for which the sensor arrays in cameras 80-1, 80-2 are sensitive, e.g., visible light for RGB and for monochrome cameras, and IR for cameras sensitive to IR energy. IR energy has 700 nm to about 900 nm wavelength and is substantially invisible to the human eye, but detected by array sensors using CCD and CMOS. If source 110 emits IR, and the camera sensor array can detect IR, cameras 80-1, 80-2 can optionally include an IR bandpass filter, e.g., filter 82 in FIG. 1A-1, to eliminate user objects illuminated by ambient rather than IR optical energy. It is understood that IR components may be present in ambient light, including sunlight. In some cameras, a preferably bandpass filter is disposed immediately adjacent the surface of pixel array 83, e.g., filter 82'. Some embodiments can intelligently use color information, captured by color cameras, to help discern landmark points. For example skin color can be used as a clue to help identify hand and finger landmarks in such systems.

In some embodiments, cameras 80-1, 80-2 are a pair of generic color cameras, or a pair of generic monochrome cameras, or a pair of IR cameras. While resolution of the two (or more) cameras preferably is identical, different resolutions could be used.

Optical source(s) 110 can be especially useful in applications where ambient light energy may be nil, e.g., in a darkened room with relatively little optical energy provided by monitor 20 reaching the desired hover zone. In such a dimly lit environment, three-dimensional hover zone 70 will be defined by the intersection of the FOVs from the various imaging cameras 80-1, 80-2, etc. and by the intersection of optical energy emitted from optical source 110. Optional light source 110 can be coupled with each camera's shutter such that source 110 only emits optical energy during exposure time. In some embodiments control line signals cause cameras 80-1, 80-2, etc. to function synchronously with optical source 110 so as to capture images with ambient optical energy alone, and with ambient optical energy and with source 110 optical energy. The sets of images thus acquired can be subtracted from one another to effectively highlight the user and any other object reflecting optical energy toward the cameras. So doing can help reduce background clutter. If desired, magnitude of light reflected by the user can be used to estimate distance to the object, where skin reflectivity is known. In other embodiments a fiducial fixedly placed at a known location in a visible background portion of the imaged scene for use as a reference object to assist in image recognition and processing, since size and location of the fiducial is known a priori. If optical source 110 is used with embodiments of the present invention, it is understood that optical source 110 is not used to project a coded light source, for example as in so-called prior art structured light systems.

Figures 1, 1D, 2:
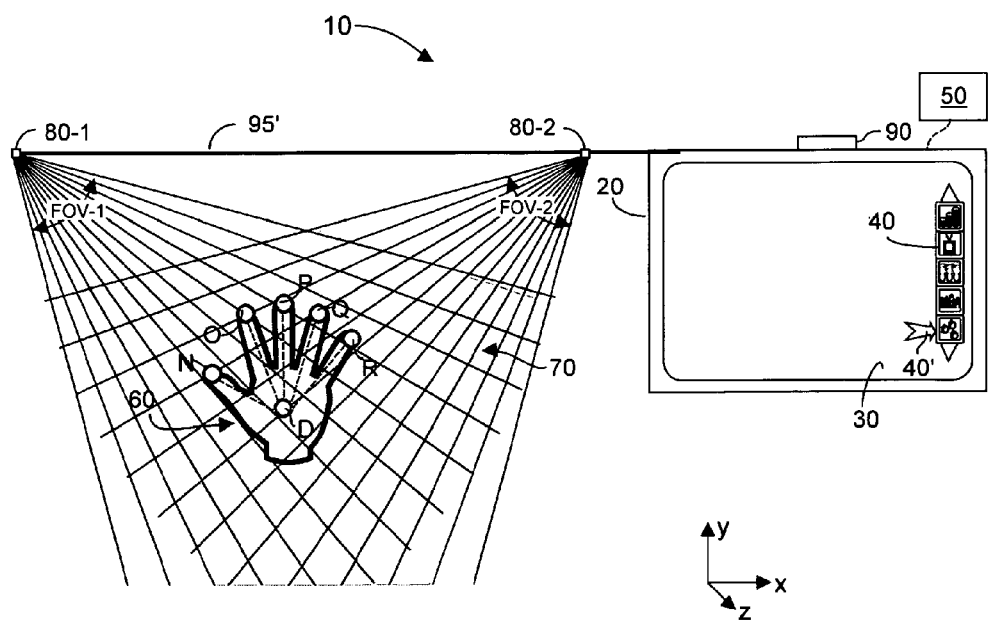

FIG. 1D-2 is applicable to the '134 application and to the present invention. FIG. 1D-2 depicts an embodiment of system 10 in which cameras 80-1, 80-2 are disposed such that resultant three-dimensional hover zone 70 is not adjacent to screen surface 30 of monitor 20. Thus in the embodiment of FIG. 1D-2, interactions by user 60 with the screen surface 30 of monitor 20 will not be detected by system 10. In FIG. 1D-2, cameras 80-1, 80-2 are attached to a preferably rigid support member 95'. Although support member 95' is shown also attached to monitor 20, the cameras need not be secured to the monitor. However successful operation of system 10 requires knowledge of the (x,y,z) position of a landmark, e.g., centroid O, relative to a fixed reference position, e.g., location of one of the cameras 80-1, 80-2. Embodiments such as shown in FIG. 1D-2 may be useful where monitor 20 is disposed out of user reach, perhaps as a large wall monitor with information that user 60 can select or otherwise command with gestures in three-dimensional hover zone 70. Indeed monitor 20 and/or device 50 may even be located out of the user's view, for example when user gestures are used to decrease the audible volume of device 50, etc.

Figure 1E:
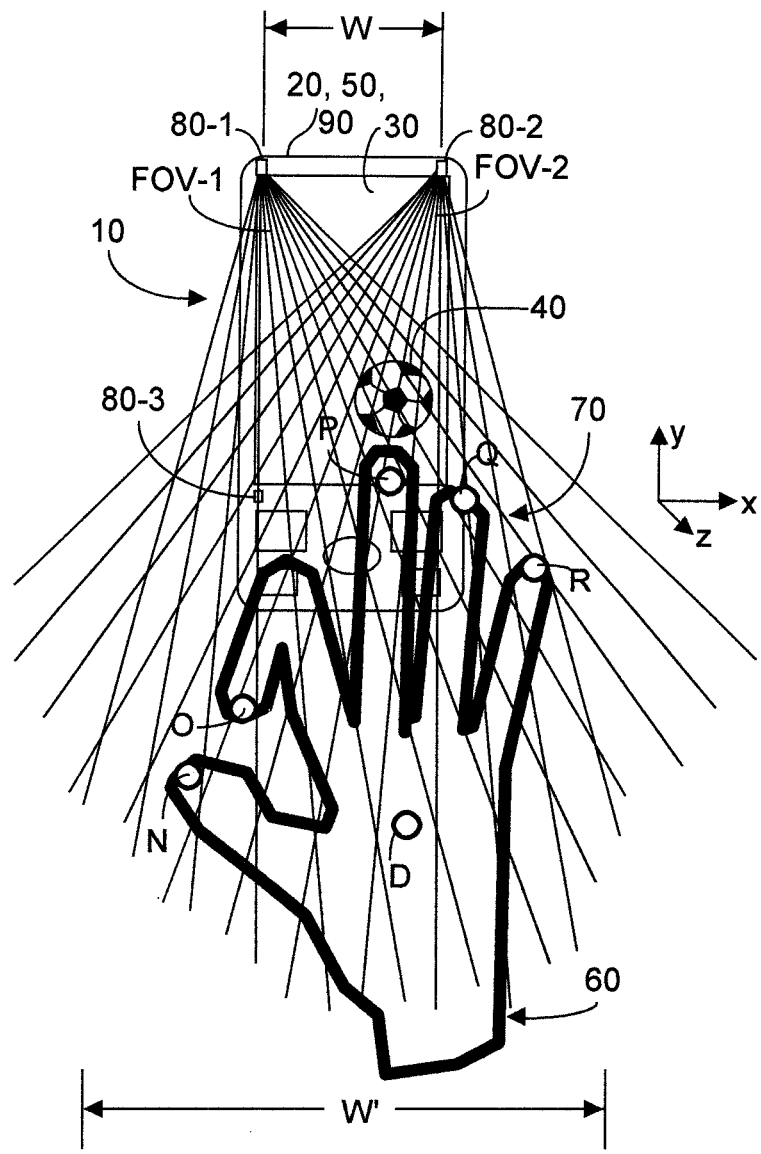
FIG. 1E is a front view of a handheld device, according to embodiments of the present invention.

FIG. 1E is applicable to the '134 application and to the present invention. FIG. 1E depicts system 10 as comprising a handheld device 50 that includes its own monitor 20 and system electronics unit 90 in a single package. Device 50 is depicted in portrait mode, with cameras 80-1, 80-2, and optionally at least a third camera 80-3, disposed at the upper left, upper right, and lower left corners of the device, with respective FOV-1, FOV-2, FOV-3 (not depicted to avoid clutter in the figure). The inclusion of camera 80-3 enables system 10 to function both in portrait mode (FIG. 1E, 1F, 1G) and in landscape mode (FIG. 1H, 1I, 1J). Displayed on surface 30 of the built-in monitor 20 is one or more objects, here a soccer ball 40. The user can interact with what is being displayed using gestures made within three-dimensional hover zone 70. For example, the user might flick the forefinger tip, denoted by legend marker O, to "deflect" soccer ball 40 toward a goal displayed on monitor 20, etc.

FIG. 1E depicts an important aspect of the present invention, namely that the three-dimensional hover zone can be substantially larger than the physical dimension of the monitor display. In FIG. 1E, the horizontal width of the display surface is distance W, which is substantially smaller than the horizontal width W' of the hover zone. This aspect enables the present invention to be used with relatively tiny displays that might be as small as the display on a smart phone. Thus the device depicted in FIGS. 1E-1J might, without limitation, be a smart phone, a tablet, etc. that can produce three-dimensional data from an object in its three-dimensional hover zone 70, without substantial inherent ambiguity.

Figure 1F:
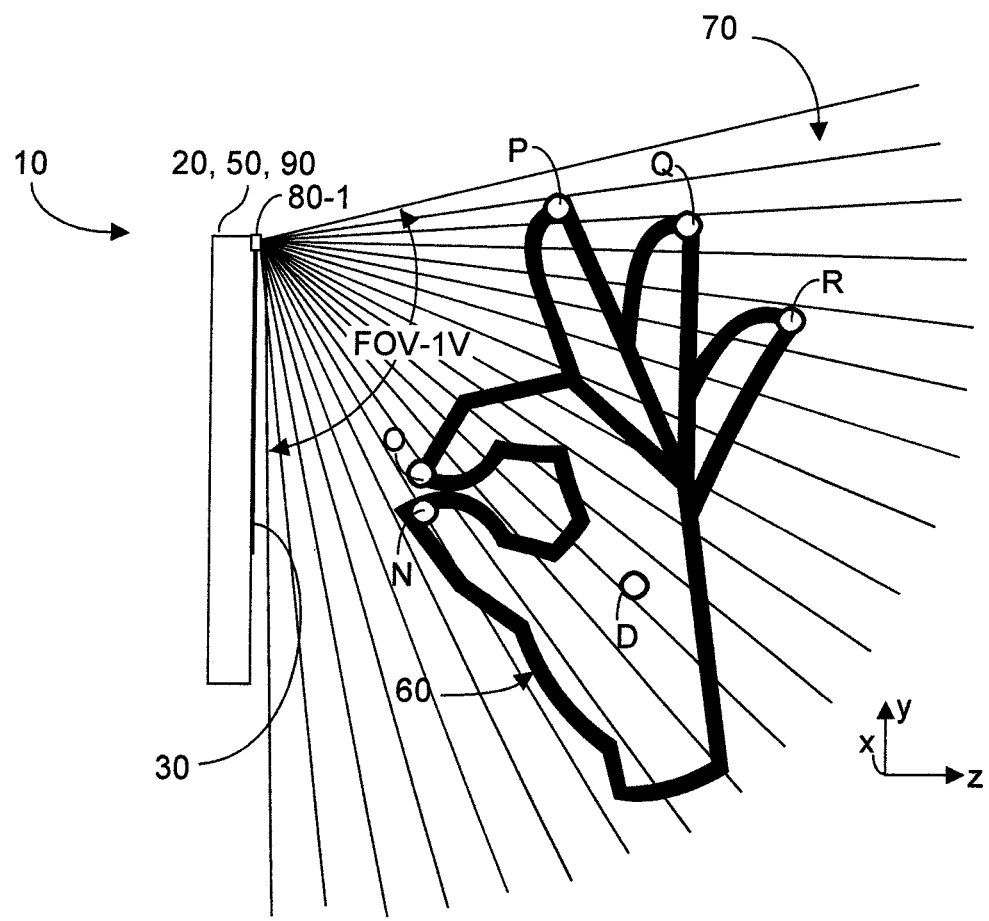
FIG. 1F is a side view of FIG. 1E, according to embodiments of the present invention.
Figure 1G:
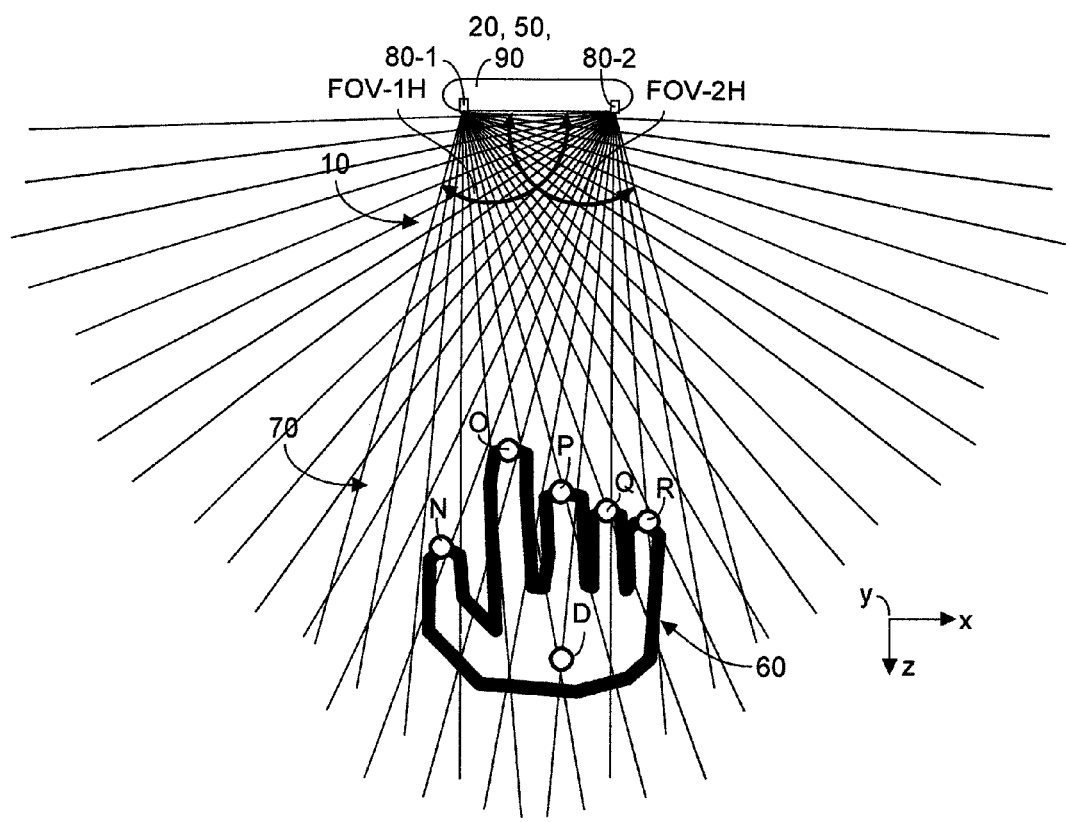
FIG. 1G is a top view of FIG. 1E, according to embodiments of the present invention.
Figure 1H:
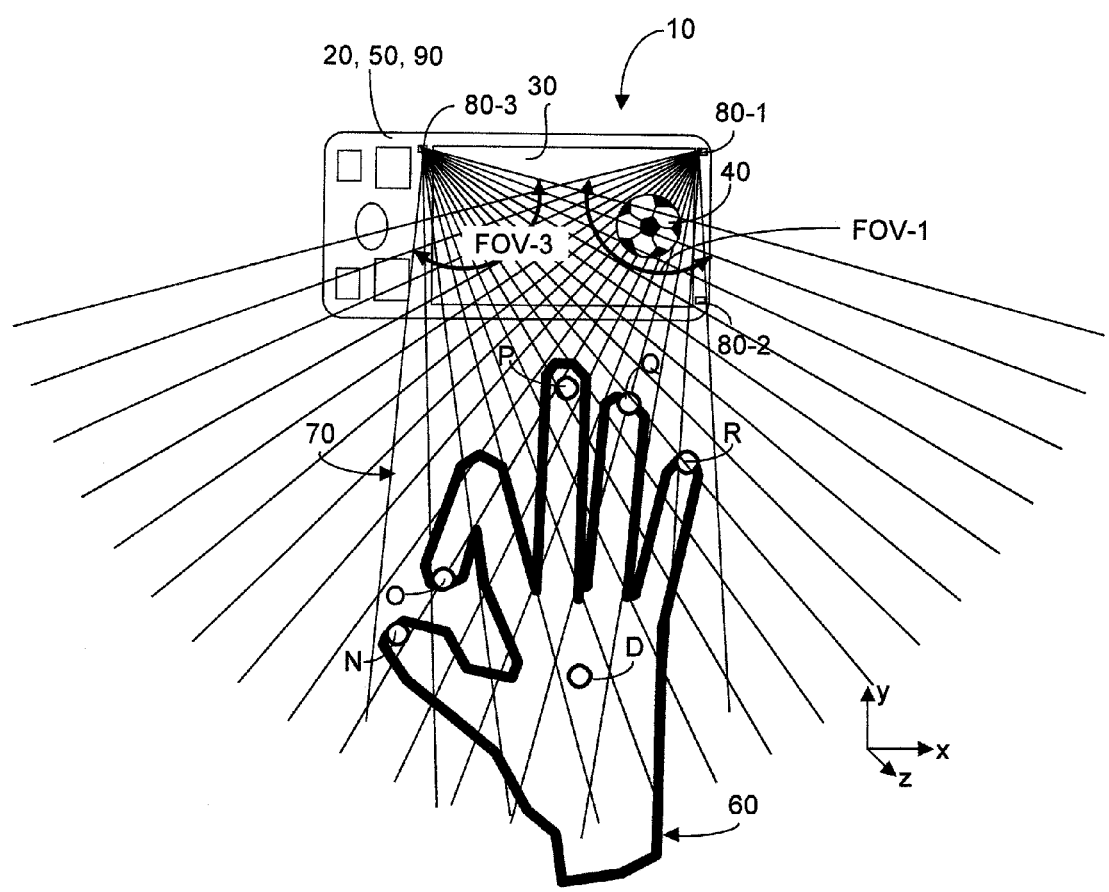
FIG. 1H is a front view of FIG. 1E, with the handheld device rotated to operate in landscape mode, according to embodiments of the present invention.
Figure 1I:
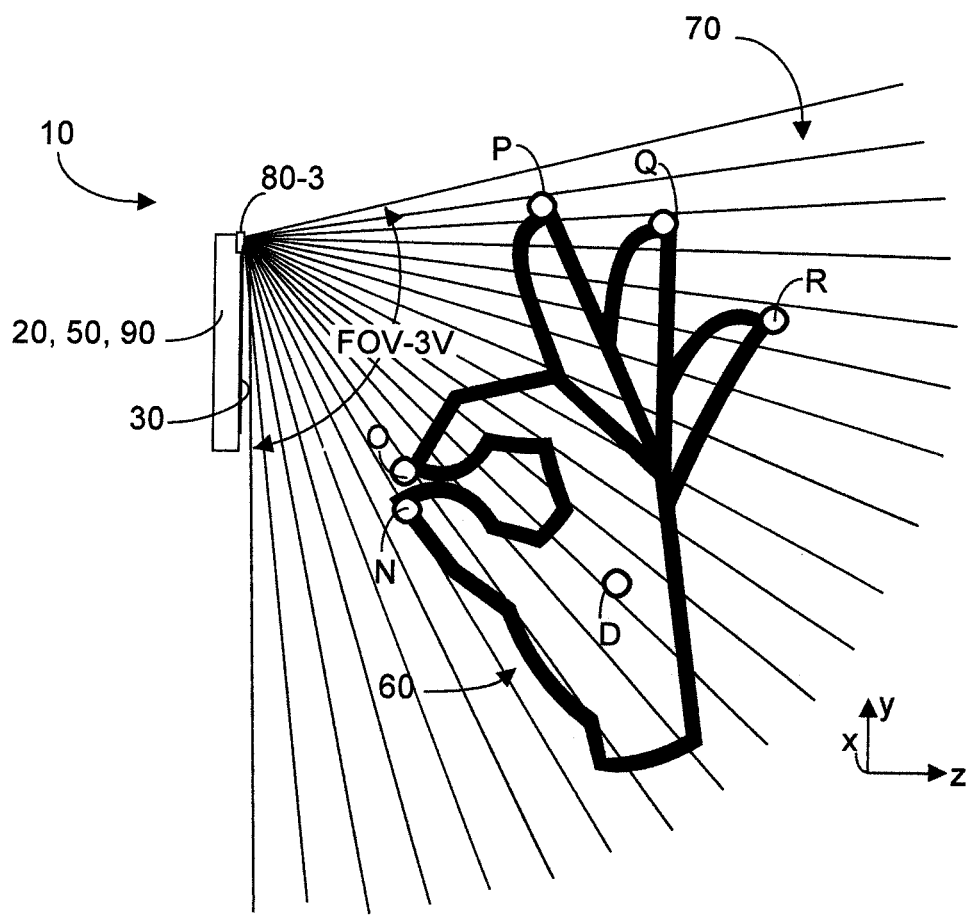
FIG. 1I is a side view of FIG. 1H, according to embodiments of the present invention.
Figure 1J:
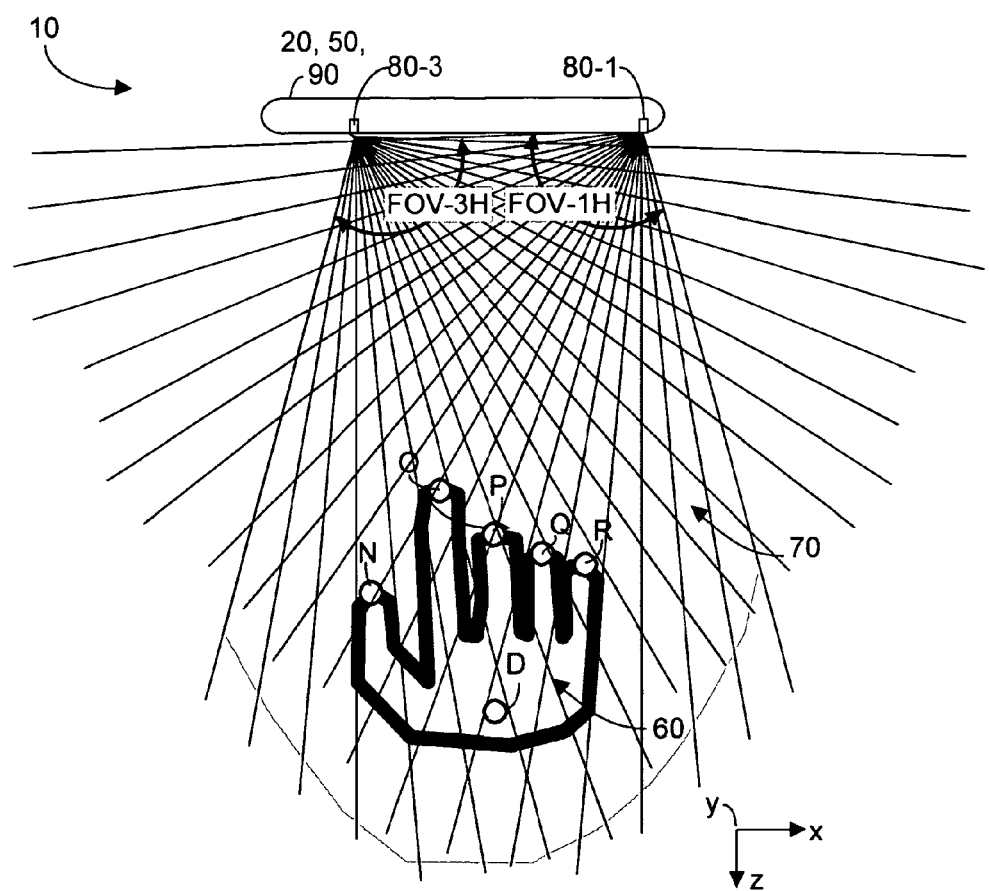
FIG. 1J is a top view of FIG. 1H, according to embodiments of the present invention.

FIG. 1F and FIG. 1G are, respectively, side and top views of system 10 as shown in the embodiment of FIG. 1E. In FIG. 1H, device 20 has been rotated 90° clockwise from portrait mode (FIGS. 1E, 1F, 1G) to landscape mode. In this disposition, the two cameras at the upper left and right corners of the device are now, respectively, camera 80-3 and 80-1 function as did cameras 80-1 and 80-2 in the portrait mode of FIG. 1E. FIGS. 1I and 1J depict side and top views of device 20 in landscape mode. It is understood that a conventional gravity sensor in device 50 can sense the appropriate portrait-landscape orientation to activate appropriate camera pairs.

In the various embodiments, cameras 80-1, 80-2, etc. are placed at a fixed-offset from each other. In practice the fixed offset will have been obtained at least in part by the necessary depth resolution for the desired application. In some embodiments the present invention may be provided retroactively, for example for use with a home entertainment system. Monitor 20 and appliance 50 in FIG. 1A may be such an entertainment system. Economically it may not be feasible to calibrate the various cameras with respect to display monitor 20. But preferably the cameras are calibrated and registered with respect to common global coordinates, and then anchored to monitor 20.

Figure 2A:
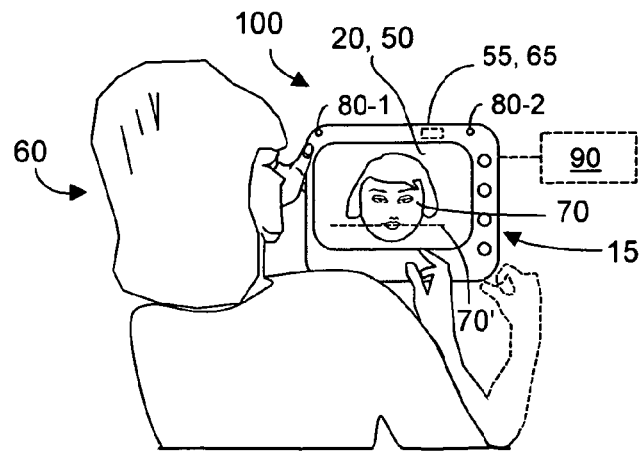
FIGS. 2A-2C depict use of device gyroscope(s) and/or accelerometer(s) to change user interaction and device display, according to embodiments of the present invention.
Figure 2B:
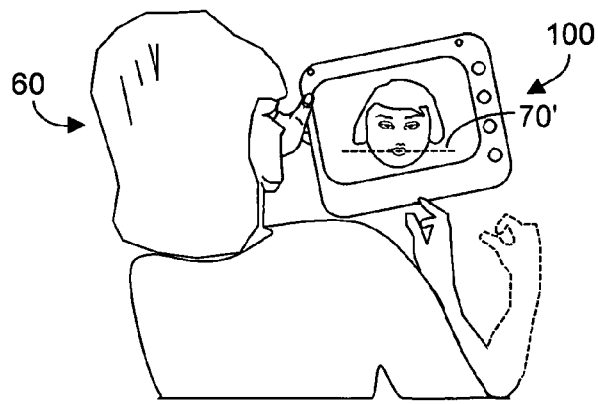
Figure 2C:
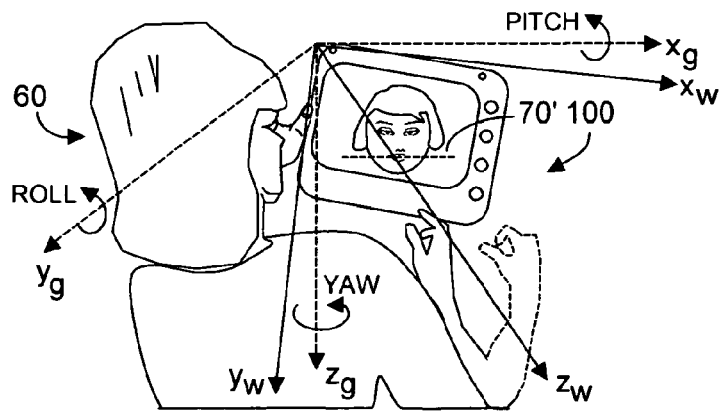

FIGS. 2A-2C depicts user 60 holding a portable device 15 that includes a built-in monitor 20, device host system 50, at least two spaced-apart cameras 80-1, 80-2, and system 90, according to embodiments of the present invention. Preferably device 15, which may be a smart phone, a PDA, a table, etc., includes at least one sensor such as a gyroscope 55, and/or accelerometer 65 (collectively, "orientation sensors"). The inclusion of at least one such orientation sensor 55, 65 enables device 15 to detect user manipulation of the device, such as device tilting, rotating, and/or motion. Orientation sensors 55, 65 typically output signals such as rotational speed in degrees/sec about the (x,y,z) axes. For ease of illustration, FIGS. 2B and 2C simply refer to the system including device 15 as 100, and do not depict or call out the various devices, systems, and orientation sensors that are called out in FIG. 2A.

Given calibration between measurements from orientation sensors 55 and/or 65, and measurements from spaced-apart cameras 80-1, 80-2, the three-dimensional application(s) associated with system 90 can estimate the center of rotation of the instruments relative to the real-world three-dimensional coordinates of the cameras. Preferably static calibration data for cameras 80-1, 80-2 is available a priori, perhaps stored in camera memory 85 (see FIG. 1A-1). If not available a priori, calibration data may be estimated using system 10 run-time measurements. Measurement data from instruments 55 and/or 65 can be combined with the camera static calibration data to augment three-dimensional (x,y,z) data that is input to system 90.

FIG. 2C shows the $(x_w, y_z, z_w)$ world coordinate system for the real-world three-dimensional input to device 100, which coordinate system preferably is bound to physical device 100. FIG. 2C further depicts a ground $(x_g, y_g, z_g)$ coordinate system, whose origin, for ease of illustration, coincides with the origin of the $(x_w, y_z, z_w)$ coordinate system. Ground coordinate system coordinates are obtained from yaw, pitch and roll data output by measurement instruments 55 and/or 65, as device 100 is manipulated by the user. The orientation of $z_g$ is defined as always being along the direction of gravity, and the $x_g, y_g$ axes define a ground plane horizontally orthogonal to $z_g$. The orientation of the ground coordinate system remains constant, regardless of device 100 orientation. Using yaw, pitch, and roll angle input, any three-dimensional input measurement position in world coordinates associated with device 100 can be converted relative to the ground coordinate system and vice versa. Such conversions may be carried out by a routine module 235, storable in memory 240 (see FIG. 3).

According to embodiments of the present invention, output signals from orientation sensors 55, 65 can be used by system 90 to augment the acquired three-dimensional data to help compensate for jitter in measurements from cameras 80-1, 80-2, resulting from physical movement of device 15 by user 60. System 90 preferably makes use of such data from orientation sensors 55 and/or 65 to modify computational factors such as scale, translation, and rotation, where any or all of these factors may be modified. For example, three-dimensional applications within system 90 can use such orientation sensor data to define an estimate of the absolute ground horizon, e.g., $x_g$-axis, and $y_g$-axis. Further, orientation sensor data from 55 and/or 65 can be used to help convert or correct measurements from cameras 80-1, 80-2 using such absolute ground coordinates.

Suppose user 60 draws a line 70' on monitor display screen 20, parallel to the ground plane (i.e. $x_g y_g$ plane). Or, let user 60 throw a virtual ball in three-dimensional space parallel to the ground plane, which is to say normal to the direction of real world gravity (the effect of gravity is not shown on the trajectory of the ball). As shown in FIGS. 2A-2C, use of orientation sensor data from 55 and/or 65 enables embodiments of the present invention to make estimates so as to cause such drawn line 70' or virtual ball trajectory, or camera 80-2, 80-2 captured image 70 of user 60 to be displayed parallel (or level) to the ground plane. This constant parallel to the ground plane display can be rendered regardless of whether device 15 is horizontal (FIG. 2A), is tilted or rotated to the left (FIG. 2B), or is tilted or rotated to the right (FIG. 2C). Alternatively, embodiments of the present invention can cause such line 70' or trajectory, or captured image of user 60 to appear level to the virtual definition of horizon in the game application being displayed on monitor display screen 20. Thus, line 70' displayed in FIGS. 2A-2C is rendered in a perspective projection of the horizon. The ability to detect and display a local, virtual-world or game-world local horizon, independently of physical tilting or rotation of device 15, is but one aspect of embodiments of the present invention.

Figure 3:
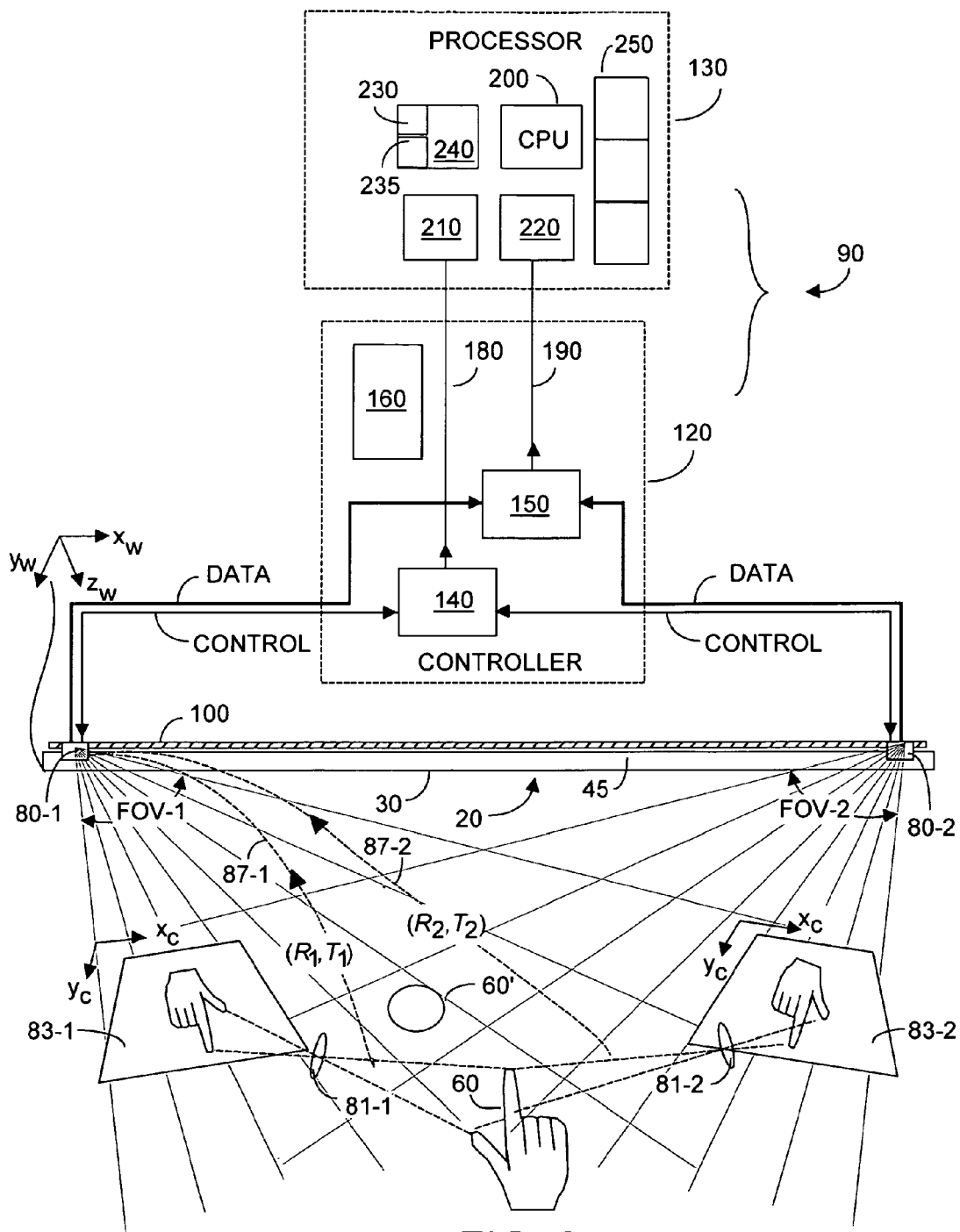
FIG. 3 is a block diagram of a system, according to embodiments of the present invention.
Figure 5:
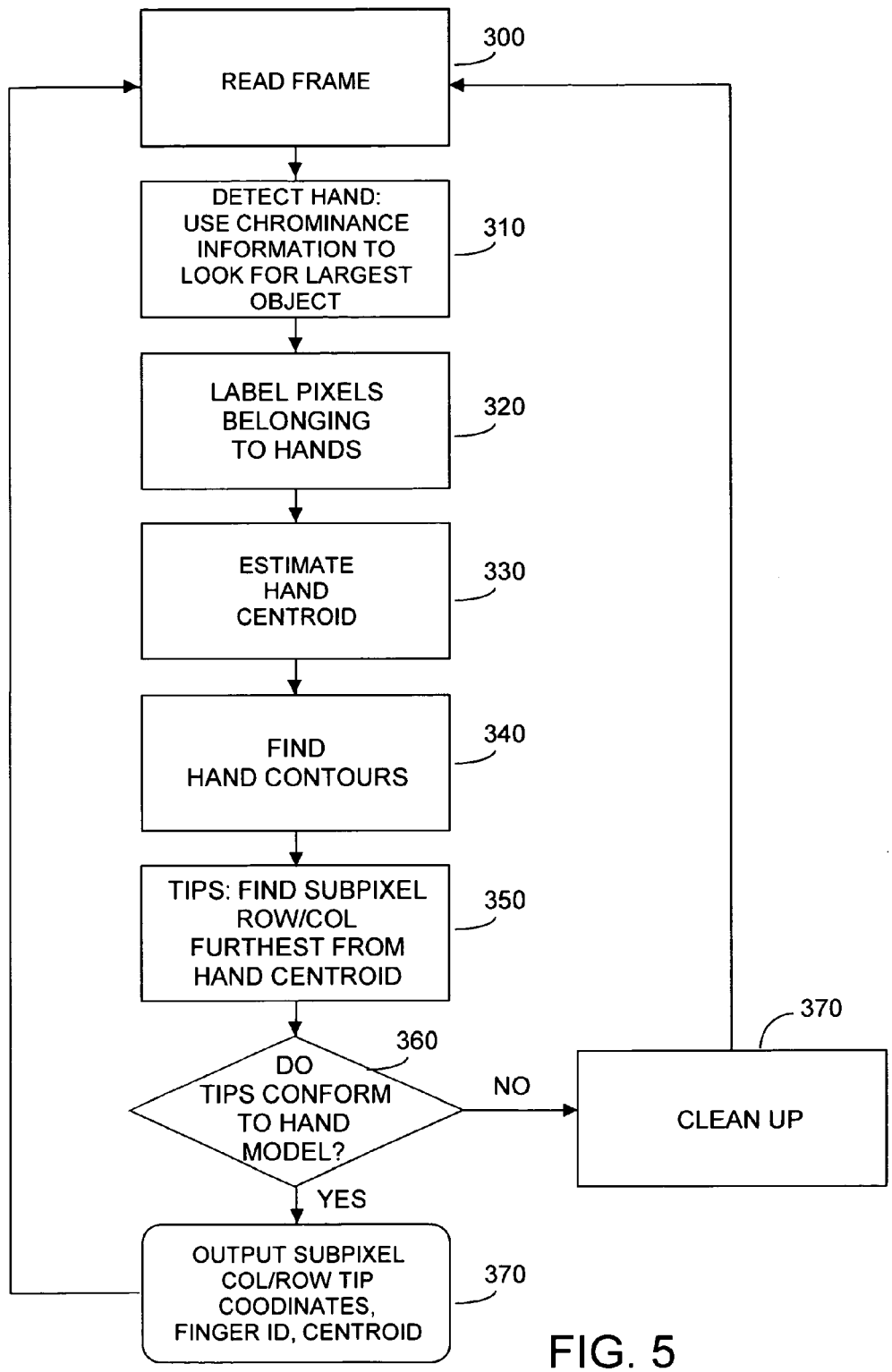
FIG. 5 is a flow chart depicting exemplary method steps in detecting a fingertip landmark, according to embodiments of the Ser. No. 13/385,134 application.
Figure 6:
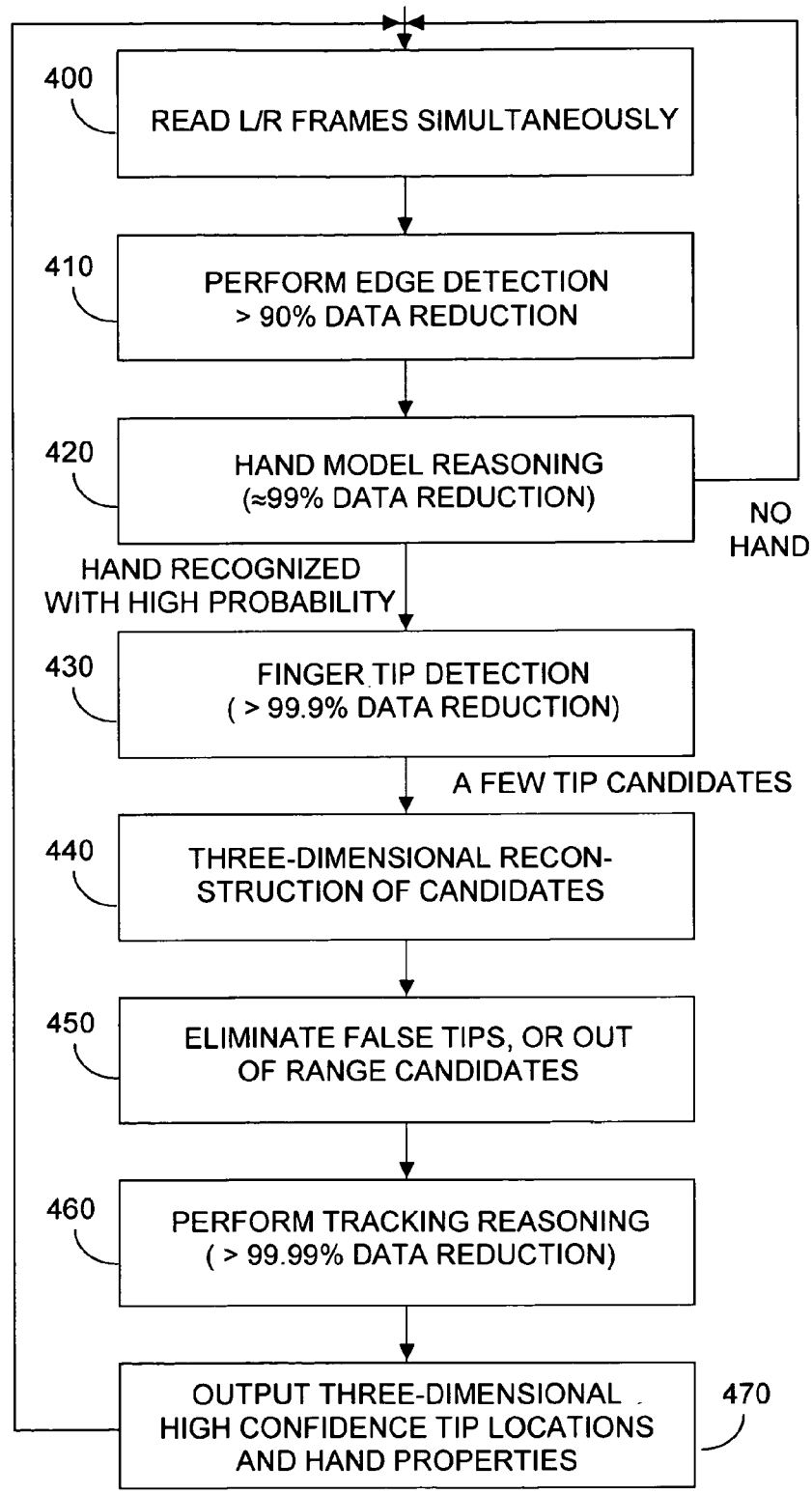
FIG. 6 is a flow chart depicting exemplary method steps for detecting a fingertip landmark using epipolar geometric analysis including image rectification, according to embodiments of the present invention.

FIGS. 3, 5, 6, and 7B depict aspects and operational steps carried out by embodiments of the present invention. Referring to FIG. 3, method algorithm(s) or routine(s) 230 used in the '134 application in carrying out steps described in FIG. 5 and FIG. 7B were storable in memory 240 in electronic unit 130. However method steps used in embodiments of the present invention to carryout method steps described in FIG. 6 are represented by algorithm(s) or routine(s) 235, also storable in memory 240. As to FIG. 7B, method step 640 was described in the '134 application, and is preferably carried out as shown by FIG. 5, e.g., by executing routine 230. On the other hand, in the present invention FIG. 7B after carrying out step 630 is followed by step 640' and is preferably carried out as shown by FIG. 6, e.g., by executing routine 235.

In operation of system 10, each camera 80-1, 80-2, etc. substantially simultaneously acquires an image of whatever may be in hover zone 70 within its FOV from its perspective for an exposure period, typically using a rolling or global shutter. Depending upon shutter architecture, the data captured is substantially simultaneously transmitted from sensor array 83 as the rolling shutter scans the scene or as exposure time of a global shutter completes. This information is controlled by electronics 90 (see FIG. 3), e.g., via lines DATA and CONTROL. As shown by FIG. 1A-1, each camera may include a processor 84 and memory 85. In some embodiments, camera processors 84 share with host system 50 processor(s) (see FIG. 3) the workload associated with performing signal processing image analysis, three-dimensional reconstruction, and event generation. Such in-camera processing activities can reduce data throughput requirements between system 10 and host 50. Host system 50 may support a graphical processing unit (GPU), in which case software, e.g., 230 in electronics 90 (see FIG. 3) can be ported to use any host GPU. Camera processors 84 can also be used to provide such relatively minimal color and exposure correction as may be desirable to detect user gestures and the like. Camera memory 85 is also useful to store previously obtained calibration data for the associated camera. The camera grid architecture used in system 10 readily enables several cameras to be used, e.g., two, three, four, to meet whatever screen touch, multi-touch and hover zone system requirements are presented.

It is useful to first provide an overall view of the methods carried out by algorithm(s), according to embodiments the present invention. Efficient operation of the present invention is promoted by balancing the load of the software algorithm execution. Such load balancing is a function of the processor architecture associated with the grid of cameras 80-1, 80-2, etc. If camera, e.g., 80-1, 80-2, includes its own processor 84 (see FIG. 1A-1), that processor can run certain initial image processing aspects of the software algorithm. Otherwise, most of the processing will be carried out in a central processor, e.g., the processor associated with host system 50 (see FIG. 1A), with a higher volume of frame data having to be sent through the camera grid, see FIG. 3, 90, etc.), to host system 50 central processor. Even if processing is done by the processor in host system 50, preferably the overhead associated with this processing should not exceed about 10% to about 15% of processor utilization. By contrast, if prior art TOF, structured light, stereo-camera systems exported part of their three-dimensional signal processing and reconstruction processing, the load upon the host central processor might reach 100% and the desired 30 frame/sec transfer rate would not be readily achievable.

The software algorithms preferably used by embodiments of the present invention will now be described generally at a logical level and with reference to potential parallelism of algorithm steps (or blocks). Such parallel steps can run on a camera processor (if available) or can be allocated to threads of a multi-threaded or multi-core host system, e.g., host system 50. Advantageously the algorithms described herein preferably are compatible to run on the graphics processing units (GPU) of the available processor(s) in host 50.

Figure 4A:
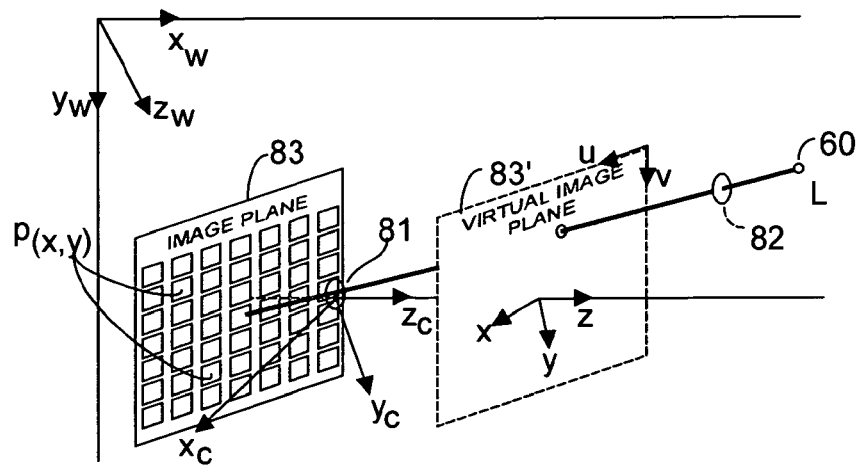
FIG. 4A depicts the relationship between world coordinates and local coordinates, according to embodiments of the present invention.

As described herein with respect to FIG. 4A, it is useful to define a global three-dimensional world coordinate system with respect to a known physical reference structure, perhaps a corner of the monitor display screen. This facilitates measuring three-dimensional positions of relevant landmarks with respect to the reference structure. Thus, at runtime, system 10 can determine the distance of the imaged user, e.g., a fingertip, from the surface of the monitor display, and, optionally, determine whether the object, e.g., fingertip, is actually touching the display screen surface. Failure to register the cameras to some identifiable surface, e.g., monitor screen, floor, can result in misinterpretation of user gestures. For example assume in FIG. 1B, that cameras 80-1, 80-2 are somehow offset slightly downward at an unknown angle relative to the screens surface of monitor 20. If the user, perhaps a finger, moves solely in the z-direction toward the screen, the camera-acquired images will be signal processed and will erroneously yield three-dimensional data that includes a y-direction component, capture what appears to be a y-direction component to the user movement. If the application involves perhaps cursor sizing and location, the cursor will undesirably be moved in the y-direction, whereas the user intended not to move the cursor but perhaps to enlarge the cursor by the z-axis movement toward the monitor screen. Thus, embodiments of the present invention carryout a step of registering each camera to an identifiable surface.

Of course, if the cameras are mounted substantially aligned with z-axis of the monitor screen, or if there is a calibrated mechanism to provide magnitude of any tilt of the cameras with respect to the screen, the above-noted issue can be somewhat mitigated.

System 10 seeks primarily to extract a relatively few relevant landmark points, typically less than about one-hundred potential and preferably perhaps a dozen or so landmark points (e.g. fingers, hands) without having to extract a lot of unnecessary three-dimensional data, and the often time-consuming and error-prone task of removing background information from acquired imagery need not be undertaken. This is to be contrasted with the prior art's necessity to process many, many hundreds of thousands of image points. Two-dimensional image recognition is carried out to locate landmarks associated with the imaged object(s) in so-called image coordinates (e.g., pixel or sub-pixel) addresses in each camera's sensor array for objects of interest, e.g., fingertips, medial axis of fingers, etc. Preferably each landmark is labeled using an identification rule. The a priori determined and stored lens distortion parameters (stored with other intrinsic camera parameters determined a priori) for each camera are used to find the undistorted image coordinates of the landmarks for each camera. A likelihood priority order of the correspondence between the landmarks across different cameras is then employed, e.g., a given index fingertip acquired in this image from camera 80-1 is most likely the same as the index fingertip in the other image acquired by camera 80-2, etc. The use of the properties of so-called epipolar scan lines can also assist in finding the best matches.

Using the stored calibration information, the (x,y,z) coordinates for each landmark are determined with respect to coordinates of each camera, subject to a scale factor. It is understood that if the camera manufacturer has not provided camera calibration information, such information will be generated and stored by the manufacturer of system 10. The scale factor represents the assumption that the real-world position of a landmark in image coordinates (i.e. a pixel or sub-pixel address) is along a given ray associated with that pixel or sub-pixel, subject to some error in the image analysis and calibration process. Rays are depicted in FIGS. 1A-1J by the spoke-like lines emanating outward from each camera to define the relevant FOV. A single ray is depicted with a bold line in FIG. 4A. The (x,y,z) camera coordinates of each landmark are converted to the common world coordinates, using the system extrinsic parameters previously determined and stored.

Next, three-dimensional reconstruction of corresponding landmarks across the cameras is carried out using at least one minimization algorithm. Essentially, the task is to find the three-dimensional intersection of at least two rays in three dimensions. The first of the two rays is from a landmark point to the pixel sensor on camera 80-1, and the second ray is from the same landmark point (but as viewed from the second view point) to the pixel sensor on camera 80-2. In practice various error factors cause the two rays to come very close to each other near the landmark point, but not intersect perfectly mathematically. Accordingly, embodiments of the present invention use a minimization algorithm to find the midpoint of two closest points in the two rays corresponding to the same (or substantially nearly the same) landmark. Note that advantageously such reconstructions involve a relatively few landmark points, as contrasted to having to deal with many three-dimensional data in a three-dimensional cloud acquired by prior art systems, e.g., structured light systems, TOF systems, and full stereo processing systems. The correspondences of unlikely pairs are cleaned up based on heuristics or information from the past correspondences or tracking predictions, e.g., using a common filter based upon probabilities, perhaps a Markov prediction or Bayesian networks method, which methods are known in the art. The algorithm then preferably performs smoothing and tracking in the world coordinates, and user interface events are produced with location information with respect to common world coordinates. By way of example, these events can be used by host system 50 (or equivalent) to dynamically alter what is displayed on monitor 20 in response to the perceived user gesture(s).

The present invention provides great flexibility in implementation. In the embodiment of FIG. 3, cameras 80-1, 80-2 are disposed behind the glass or other protective front surface 30 of the LCD 45, thus providing three-dimensional landmark sensing without adding to the width of the monitor 20. The cameras could also be disposed behind the front bezel that typically frames LCD screens. In either embodiment, a virtually flush installation of the present invention can be accommodated, without adding protrusions from the front of monitor 20. Two user objects 60, 60' are depicted in front of monitor 20. FIG. 3 combines a partial cutaway top view of monitor 20 and also depicts a block diagram of the electronic unit 90, which comprises a controller unit 120, and a processor unit 130. Within the overlapping three-dimensional FOVs of the two cameras is a hand object 60, whose image will be captured by cameras 80-1, 80-2. Each camera has a lens 81-1, 81-2 (see FIG. 1A-1), and an image plane 83-1, 83-2 defined by coordinate axes $(x_c, y_c)$. Camera-captured images of the hand object 60 appear on the two image planes. Phantom lines in FIG. 3 are light rays from points on the user object 60 to image points on the image planes, which light rays pass through respective lens 81-1, 81-2 associated with respective cameras 801-, 80-2. FIG. 3 also depicts graphically transformation of two-dimensional coordinates $(x_c, y_c)$ from the individual camera (80-1, 80-2) image planes 83-1, 83-2 (see also FIGS. 1A-1, 4A, 4B, 4C) to a common global coordinate system $(x_w, y_z, z_w)$ that preferably is referenced to system 10, e.g., perhaps a corner of monitor 20. Arrowed lines 87-1, 87-2 depict the direction of these transformations, which involve the vector (R, n transformation described elsewhere herein.

Each camera 80-1, 80-2, etc. preferably has a pair of interface lines (e.g., a common ground line), a data line drawn with a heavy line, and a control line. The data line is used to transfer frames of camera-acquired images, and the control line is used to send/receive commands, synchronization signals, and queries to/from the cameras. Preferably, controller unit 120 includes logic circuitry 140, 150 and performs tasks related to aggregation of data, and to facilitating synchronization of the cameras. Preferably the cameras acquire their images substantially simultaneously, which in practice means camera exposures are synchronized to each other within about ±1.5 ms. Preferably controller unit 120 further includes memory, e.g., flash memory 160, to preserve configuration data for each camera, including the calibration data that described the geometric properties, i.e., intrinsic and extrinsic parameters, for each camera.

Logic circuit 140 preferably can broadcast synchronization signals to the cameras under program or instruction from CPU 230 in processor unit 130, via line 180. Alternatively, one camera can take the role of a controller and send a synchronization signal to other cameras substantially replacing the role of controller 140. When data is captured, the data awaits its turn to send the frame information via the data line to controller unit 120, or optionally nearly simultaneously directly to processor unit 130 via logic module 140. The controller unit, in turn sends aggregated frames to the host CPU 200 via line 190. Embodiments of the present invention can encompass a variety of data line protocols, including without limitation industry standards such as MIPI, USB 2.0, USB 3.0, and a variety of controller line protocols including without limitation industry standards such as I2C, USB. Wireless control lines including Bluetooth could be employed if acceptable latency can be provided, e.g., 1 ms, at sufficiently low cost commensurate with the low overall cost to implement the present invention.

In the embodiment shown in FIG. 3, processor module 130 provides the necessary software drivers 210, 210 for the data and control lines. Without limitation, driver 210 may be a USB driver that manages the collection of frames at a preprogrammed frame rate as set by a software algorithm module 230, stored in memory 240 associated with processor module 130. Algorithm module 230 preferably is a software component that uses the data frames collected by the cameras to perform image processing as needed. Thus, algorithm module 230 performs such three-dimensional reconstruction of landmarks identified on object 60, 60', under control of CPU 200, for delivery to host device 50 as application events. Host system 50 can then command appropriate movement of images 40 displayed on monitor 20, depending upon the application being used. An exemplary description as to the theory of operation of algorithm module 230 is given below, in conjunction with the description of FIG. 5.

Communications of data and control in system 10 between the various cameras 80-1, 80-2, etc. in the camera grid and electronic unit 90 preferably is via a communications channel that includes DATA and CONTROL lines (see FIG. 3). Signals on the control line can govern the sending and receiving of synchronization signals to the cameras comprising the camera grid. Synchronization may be a simple signal propagated in the grid to control the start and stop of exposure for the cameras. Control signals may also be used to synchronize camera exposure time with on-time of any external active light source 110 (see FIG. 1D-1) that is activated periodically, etc. Various communications architecture and protocols may be used, including daisy-chaining.

Each camera preferably includes its own interface unit 86, which helps make the number of cameras in the grid readily expandable, e.g., two cameras, three cameras, four cameras. Exemplary communication buses in FIG. 3 can include MIPI, I2S, USB, etc. It is understood that bus bandwidth should be able to transmit data frames at a rate commensurate with the application for which system 10 is used. For example, if sensor array 83 (FIG. 1A-1) has 640×480 pixel sensors $p_{(x,y)}$ and transmits at 30 frames per second with 24 bits per pixel, then bandwidth needed is slightly more than 221 Mbits per second. Cumulative bandwidth requirements increase when frame data is aggregated from other camera sensors. However this estimate can be overestimation in that actual (e.g., USB level) bandwidth calculation depends on how and where the RGB pixel is constructed.

Various compression methods may be used for cameras having higher pixel density sensor arrays 83. One can use MPEG or some other form of image compression to substantially reduce data size and associated required bandwidth, but with an associated cost and complexity penalty of requiring an MPEG coder and decoder. Thus, embodiments of the present invention may use a semantic compression that transmits only segments of the acquired image that are of interest for the relevant application. A semantic compression is one that understands the image, e.g., if the object is known to be a hand, the processor can reduce the data to be transferred to only those pixel addresses representing a few fingertip points, or other key landmarks for a gesture application. In an extreme case, it can suffice to transmit only the relatively sparse data representing location (i.e., relevant $p_{(x,y)}$ pixel row/col addresses in sensor pixel array 83, see FIG. 1A-1) of one or more pixels that represent the tip of a single (or multiple) pointer object(s). In other words, some form of image segmentation logic in the camera module can substantially reduce the amount of transmitted data because only data from camera array pixels containing interesting scene regions, e.g., landmark data or edges, need be transferred. In another aggressive compression model, the processor may reduce the volume of data transfer to host by reducing the image to a few pixels representing a few landmark points, perhaps the contour of a user's hand, and their properties, or even perform some rudimentary gesture processing, and send the results of the host. An example of a relatively few landmark points might be fingertip points relating to the tip of at least one user finger or other object, used in a gesture application.

It may be advantageous in some embodiments to use a grid of cameras 80-1, 80-2, etc. that can provide at least some processing with single or multi-core processor, preferably providing vector or scalar instructions. Each camera may contain its own processor(s), e.g., 84 in FIG. 1A-1, or some cameras may not have their own processor, but share processing with another camera in the grid that has its own processor, e.g., 84. Each camera may include its own memory 85, flash (non-volatile) or volatile memory, that can store camera calibration or other configuration information. Information in volatile memory can support processor programming and can also store temporary data during the system 10 operation. Such processors in the grid may provide synchronization control or data links. Among other roles, the processor can control the camera and pre-process frames, e.g., carrying out some image processing stages such as segmentation, etc.

Segmentation involves labeling pixels that are part of the acquired image foreground and presumably the user of interest, which is to say that segmentation seeks to find these key parts in the camera-acquired images. For instance, for a user hand object, segmentation labels pixels that are part of the hand and wrist, palm and fingers. If two hands are imaged, segmentation can identify up to ten finger parts, e.g., landmarks, and the result of the segmentation process from each camera is thus an image that has unique labels for each finger, palm and wrist, e.g., an image of the relevant landmarks N, 0, P, Q, R, etc. in FIG. 1D-1. Such image of the relevant landmarks can be represented more, compactly and thus require less bandwidth and less memory storage than if the entire frame of acquired imagery were processed and stored. The segmentation algorithm can run in parallel for the image acquired by each camera, and if the camera includes processor 84 (see FIG. 1A-1), each such processor can perform segmentation on each image. Alternatively, a central processor, e.g., within processor unit 130 (see FIG. 3) can schedule parallel threads to perform the multiple segmentation tasks simultaneously. Segmentation and use of probable landmarks before the three-dimensional data is reconstructed further enable implementation of system 10 with inexpensive, generic components, unlike many prior art approaches.

Image segmentation algorithms are known in the art. Some algorithms make assumptions as to object shapes, e.g., a finger is a cylinder that begins with a tip and ends when it joins a wider body of pixels representing the palm of the hand object. If the cameras acquire color information, the algorithm can use color features to assist in segmentation. Other algorithms store hand model data, and then try to match a camera-acquired image of an object to see which stored model provides the best object match. If the model matching is reasonable acceptable, other image parts can be readily determined since they are already identified in the model. From the perspective of a single camera 80-1, a finger object 60 can be occluded by the other fingers, yet still be visible to another camera 80-2 because of the differing vantage point. Thus in many instances occlusion difficulties can be overcome because of the multi-camera approach used in the present invention. While true three-dimensional reconstruction will not occur for the occluded object, nonetheless if it is imaged by the second camera its presence and its position relative to the first, non-occluded, object may be inferred.

It is useful at this juncture to consider FIG. 4A, which depicts concepts used in defining a global system of coordinates, according to embodiments of the present invention, although an intuitively identifiable coordinate system is not necessary for implementing all types of natural interface applications. However a global system coordinate system is useful and can be defined with respect to a known world point (e.g., the upper left corner of the monitor display screen).

Let $(_{v_d}{}^{u_d})$ be the pixel coordinate of a landmark on a user 60 as observed in hover zone 70 by at least two cameras, e.g., 80-1, 80-2. For ease of understanding, FIG. 4A depicts a user or user object at location L, an optional filter 82 intermediate the object and the camera lens 81, and also shows sensor array 83 of pixels $p_{(x,y)}$ for a camera. Lens 81 will be equidistant between array 83 and a virtual image plane 83', drawn with phantom lines. A single ray (of many rays) within the FOV of the camera sensor array and lens is drawn with a bold line (for ease of understanding) terminating at point L, object 60. It is understood that FIGS. 1A-1L depict a plurality of converging rays, of which the ray in FIG. 4A is but one such ray Each camera, e.g., 80-1, will image the landmark in different (sub) pixels of its array 83 depending on its vantage point with respect to the user object of interest. The present invention seeks to find the most likely correspondences between the landmarks. Use of camera calibration and global registration information enables calculating rays emanating from each camera that pass through L. Clearly, the intersection of the rays from at least two cameras defines the location of L in three-dimensional space in the active area. However, in a real (non-ideal) system, the rays do not intersect due to slight offsets resulting from calibration error, the error introduced due to the vantage point of each camera, quantization and detection errors, etc. Nonetheless, a solution can be found that minimizes a cost function (in this case, the distance between multiple lines) and produces an estimated three-dimensional point that is close to theoretical intersection point. Such techniques are described by Hartley and Zissermann "Multiple View Geometry in Computer Vision", second edition, Cambridge University Press, March 2004.

Let $(_{x_d}{}^{x_d})$ be the image coordinate of the landmark, let $(_{v_n}{}^{u_n})$ be the undistorted pixel coordinate of the landmark, and let $(_{y_n}{}^{x_n})$ be the undistorted image coordinate of the landmark.

The relationship between $(_{v_d}{}^{u_d})$ and $(_{x_d}{}^{x_d})$ is obtained from:

$$u_d = u_0 + \alpha x_d + cy_d$$

$$v_d = v_0 + \beta y_d$$

where $\alpha$ and $\beta$ are scale factors of the camera sensor (i.e., pixel dimensions), and c is the camera pixel array skewness, where in an ideal sensor, $\alpha = \beta$ and $c = 0$. The parameters $u_0$ and $v_0$ are the center of the image, and parameters $\alpha$, $\beta$, c, $u_0$ and $v_0$ are obtained from the calibration step of each camera.

Cameras 80-1, 80-2 as used in the present invention system 10 have relatively large FOVs, and consequently distortion effects cannot be ignored. For metrology applications such as touch measurement or certain computer vision detection algorithms, lens distortion must be corrected. Camera lens distortion has a dominant radial factor and a less dominant tangential factor. The more dominant radial distortion may be modeled as follows:

$$x_d = x_n + x_n[k_1 r_n^2 + k_2 r_n^4 + \ldots]$$

$$y_d = y_n + y_n[k_1 r_n^2 + k_2 r_n^4 + \ldots]$$

where $r_n^2 = x_n^2 + y_n^2$

Parameters $k_1, k_2, \ldots$ are lens distortion parameters and are estimated from the calibration step for each camera module. The solution method for $$\begin{pmatrix} x_n \\ x_n \end{pmatrix}$$

may include iterative or other numerical methods that are available in the literature.

Let $$\begin{Bmatrix} X_c \\ Y_c \\ Z_c \end{Bmatrix}$$

be the coordinate of a landmark in the camera coordinate. Let $$\begin{Bmatrix} X_w \\ Y_w \\ Z_w \end{Bmatrix}$$

be the coordinate of the land mark in a world coordinates.

FIG. 4A depicts camera coordinates ($x_c, y_c, z_c$) and world coordinates ($x_w, y_w, z_w$) for a single camera, e.g., 80-1. Similarly, each other camera has its own camera coordinates but shares the same world coordinates, which are not shown in FIG. 4A.

From the camera model one has:

$$X_c = Z_c/f \times x_n$$

$$Y_c = Z_c/f \times y_n$$

In other words, $$\begin{pmatrix} x_n \\ x_n \end{pmatrix}$$

is the projection of a landmark point $$L = \begin{Bmatrix} X_c \\ Y_c \\ Z_c \end{Bmatrix}$$

in the image plane after unwrapping the effect of distortion. Of course, many points along the ray that passes through L are also projected to the same image point $\begin{pmatrix} x_n \\ x_n \end{pmatrix}$. Resolving this particular landmark in three-dimensional speed requires information about the same (or nearby) point, from the other camera(s). But before one can use the additional information, it is necessary to calculate coordinates of L in a common world coordinates because camera coordinates do not present accessible reference information to the application. Let the $$L = \begin{Bmatrix} X_w \\ Y_w \\ Z_w \end{Bmatrix}$$

be the coordinate of point L in a common world coordinate.

The transformation from camera to world coordinates is given by:

$$\begin{Bmatrix} X_w \\ Y_w \\ Z_w \end{Bmatrix} = R \begin{Bmatrix} X_c \\ Y_c \\ Z_c \end{Bmatrix} + T$$

where R(3×3) and T(3×1) are rotation and transformation matrices, respectively. The extrinsic parameters R and T are obtained during camera calibration when cameras are registered to the same common global coordinate system.

The issue of correspondence must also be addressed. When a real world object, e.g., user object 60, is imaged substantially simultaneously by multiple optically similar cameras, e.g., 80-1, 80-2, etc., different parts of the same object map to different camera array pixels depending upon relative orientation and distance of the cameras with respect to each other. Solving the image correspondence means determining where the same object is mapped in two or more images from the same camera (during user object motion) or from different cameras. Determining object correspondences is important to correctly determine the three-dimensional position of an object using the geometrical properties of a camera grid. It is well-known in the art that unless correspondence is established correctly, three-dimensional reconstruction can produce ambiguous results. According to embodiments of the present invention, camera calibration information and information from landmark identifiers is used to disambiguate the correspondence problem.

It should be also noted that even if the same object is being imaged by all cameras, the fact that they view the same object from different vantage points and from different distances, the image imprint of the object in each camera can be very different. For instance, a user finger can fill the frame of a nearby camera but only occupy a small part of the frame of a distant camera. However when the user object is a comfortable distance from each camera, occlusion difficulties are lessened and substantial benefits can be obtained from the multiple views that are obtained to recognize landmark(s). If the user object is very far from the cameras, occlusion problems are less of an issue.

Figure 4B:
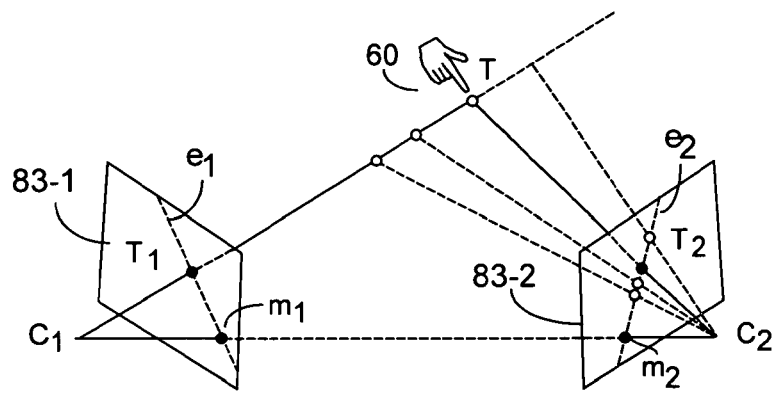
Figure 4C:
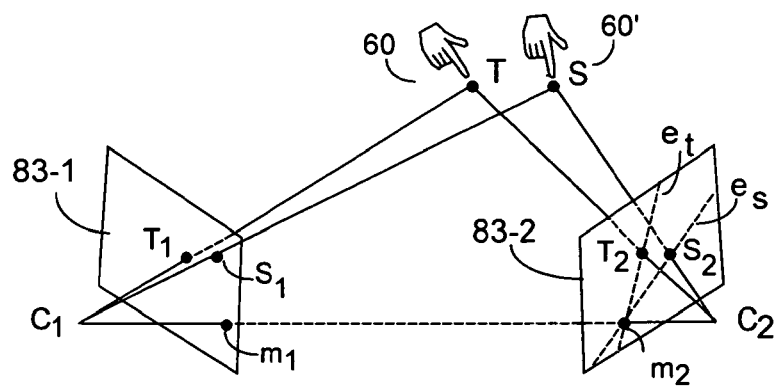

FIG. 4B and FIG. 4C depict the application of epipolar line geometric properties of system 10 and cameras 80-1, 80-2, according to embodiments of the present invention. Embodiments of the present invention promote low processing requirements and improve latency times by recognizing and taking advantage of these epipolar properties to enhance disambiguation between multiple potential object landmarks during three-dimensional reconstruction. Epipolar geometry is typically defined by assuming a pinhole camera model. As noted herein, cameras 80-1, 80-2 preferably are calibrated and registered with respect to each other.

As noted herein, registration maps the lens coordinate system of cameras 80-1, 80-2, etc. to a common coordinate system, e.g., a corner of the display monitor, the center of the baseline separating the two cameras, etc. The associated calibration information enables each camera to be converted operationally so as to satisfy the characteristics of a pinhole camera. So doing entails determining the distortion model for cameras 80-1, 80-2, un-distorting camera-acquired images, and then finding camera intrinsic parameter values. Of course if camera(s) 80-1, 80-2 have exceedingly good lenses, distortion may be nil, in which case un-distorting method steps may be dispensed with. This information is saved, e.g., in memory 240 (see FIG. 3), for use during system 10 run-time operation. Once cameras 80-1, 80-2 can be modeled as pinhole cameras and registered to each other, the properties of epipolar geometry can be advantageously employed to reduce processing search time to find landmarks (e.g., A, B, C, D, etc., see FIG. 1A) acquired by a multi-camera system 10.

Referring to FIG. 4B, let $C_1$ and $C_2$ denote the center of optical projection for cameras 80-1, 80-2 respectively, where 60 denotes the user interface target, here a pointing fingertip, a potential object landmark. Cameras 80-1, 80-2 each image the user target from their respective spaced-apart positions. The fingertip object projects onto image plane 83-1 (of camera 80-1) at location $T_1$, and projects onto image plane 83-2 (of camera 80-2) at location $T_2$. The intersection of light rays $T_1$, T and $T_2$, T defines the (x,y,z) location of T in three-dimensional real space. The intersection of line $C_1$-$C_2$ with image plane 83-1 is denoted $m_1$, and the intersection of line $C_1$-$C_2$ with image plane 83-2 is denoted $m_2$. $C_1$, $C_2$, and T define a plane that intersects with image plane 83-1 to define an epipolar line $e_1$. The projection of any point in light ray $T_1$-T maps to point T1 in image plane 83-1. The same plane defined by points $C_1$, $C_2$, and T intersects with image plane 83-2 to define an epipolar line $e_2$. The projection of any point in light ray $T_1$-T maps to epipolar line $e_2$.

This observation is significant because finding the image of any candidate point along ray $T_1$-T can be simplified to looking for candidate points along epipolar line $e_2$, rather than searching the entire image for candidate points. At this juncture, at step 440 in FIG. 6 a limited number of potential three-dimensional candidate landmark points under consideration, perhaps on the order of 100 points from one image plane and perhaps 150 points from the other image plane. Perhaps 80 of these 250 points are found on both image planes. Identifying corresponding points could be carried out by a time-consuming process of comparing every candidate point from one image plane to every candidate point on the other image plane, a calculation involving perhaps 100·150 or 15,000 steps for the example given. More preferably, the present invention recognizes that from the 100 candidate points in the first image plane, 100 epipolar lines can be defined and projected onto the second image plane. According to embodiments of the present invention it suffices to simply look for corresponding candidate points on the second image plane that lie upon these epipolar lines, disregarding candidate points on the second image plane that lie elsewhere. In practice one can define "fat" epipolar lines to account for tolerances associated with camera calibration, e.g., relevant candidate points in the second image plane might occur very close to rather than directly on theoretical epipolar lines from points in the first image plane.

FIG. 4C is similar to FIG. 4B, and demonstrates application of epipolar constructs, especially to disambiguate between multiple landmark user objects 60 (T), 60' (S). Camera 80-1 images objects 60, 60', which appear at positions $T_1$, $S_1$ on associated camera image plan 83-1. Substantially simultaneously, camera 80-2 images the same two user objects, which appear at positions $T_2$, $S_2$ on associated camera image plan 83-2. Referring to image plane 83-1 (associated with camera 80-1), the two images landmarks $T_1$ and $S_1$ preferably are identified using image analysis algorithm(s) 235 as described herein with respect to FIGS. 6 and 7B. Let us assume that shape analysis is not conclusive, which implies uncertainty as to whether $T_2$ or $S_2$ are images of point T in plane 83-2. According to embodiments of the present invention, disambiguation between $T_2$ and $S_2$ involves defining an epipolar line $e_r$ in image plane 83-2, and determining whether $T_2$ or $S_2$ lie upon this line. Per FIG. 4C, $T_2$ lies upon epipolar line $e_r$ and $S_2$ does not. Thus one can rapidly conclude that $T_2$ corresponds to $T_1$ and both represent image 60, to the exclusion of potential candidate $S_2$. Once this correct correspondence is established, the present invention can determine the three-dimensional (x,y,z) coordinate position for object 60 (T).

Note in FIGS. 4B and 4C that the epipolar lines were at an arbitrary angles with respect to axes of the image planes. Traversing these lines to resolve correspondences is complicated and costly. Traversing would be simplified if the images were rectified such that such a pair of corresponding epipolar lines became collinear and parallel to each other alone one of the image axes. Image rectification methods are known in the art, e.g., see "*Introductory Techniques for* 3*D Computer Vision*" by E. Trucco and A. Verri, 1998.

FIG. 4D and FIG. 4E depicts two user hand objects that each has at least one projecting finger. In FIG. 4D, the hand and finger images were captured by left camera 80-1 (see FIG. 3), and the forefingers are denoted 60'-L and 60-L. The images in FIG. 4E were captured by right camera 80-1 (see FIG. 3), and the forefingers are denoted 60'R and 60-R. FIG. 4F and FIG. 4G represents the rectified images, respectively, of FIG. 4D and FIG. 4E. Note that the captured images differ somewhat, which is not unusual given that each camera captures images from its own unique viewpoint.

In the rectified images depicted in FIGS. 4F and 4G, the epipolar lines are collinear and parallel to the horizontal image plane axes. As noted elsewhere herein, transformation parameters used to rectify the images preferably are obtained from the intrinsic and extrinsic parameters for the cameras, which are obtained generally during factory calibration of the cameras.

Thus epipolar lines, e.g., $ep_1$, $ep_2$, $ep_1$, etc. are shown horizontally, parallel to display monitor scan lines in FIG. 4F and FIG. 4G. Looking at image point 60-L (acquired by camera 80-1) in FIG. 4F, it is easy to discern that correspondence exists with point 60-R but not with point 60'-R (acquired by camera 80-2) in FIG. 4G, because epipolar line $ep_1$, passing through point 60-L, also passes through point 60-R. Furthermore, there is less chance of erroneously establishing correspondence between fingertip 60-L and fingertip 60'-R because 60'-R lies on a different epipolar line, $ep_2$. Rectified images in FIGS. 4F and 4G may be reduced at their edges as shown by boundaries 195L and 195R because not all image segments acquired by left camera 80-1 have a corresponding image segments acquired by right camera 80-2. The images can be constrained to lie within a rectified rectangular image boundary of one camera by defining bounding rectangle 197-L and 197-R.

Thus, one aspect of the present invention recognizes that cameras 80-1, 80-2, etc. can be modeled as pinhole cameras. Such pinhole camera modeling warrants application of epipolar geometric analysis and image rectification to camera acquired data. Such analysis enables system image processing computation and recognition of landmark points to occur very rapidly and reliably, using relatively inexpensive components. Further such analysis is one of the factors contributing to reduction of overall system latency times.

Referring now to FIG. 3, software 230 preferably includes a recognition module that uses visual information obtained from cameras 80-1, 80-2 to interpret and understand the user's intention communicated by the detected gesture, e.g., take this action here, move this displayed object there, etc. The user intention may include implied positional and gestural information. For instance, the user intention may be verbally described as "open this folder," or "move this object from here to there on the display screen." By way of example, an "open" intention may be defined as an open hand gesture made by the user within the hover zone. Software algorithm 230 can analyze in two-dimensions the shape of the image acquired from each camera of the user's hand and determine user intent to open something. This could be accomplished without need for positional information to determine that the user wants to open something. If the image acquired by one camera is vague (non-conclusive), the image(s) from the other camera(s) can be used to increase confidence in detecting an open gesture.

In the above example, the recognition algorithm must determine what is meant by "this," "here" and "there." Relevant clues can be obtained by determining the position of the user hand (or pose of user head) with respect to some real world objects or icons displayed on the screen of monitor 20 (FIG. 3). Further, images from multiple cameras are available to reconstruct a three-dimensional view, for which relative position of objects in the real world can be determined. Thus, embodiments of the present invention are optimizable for two-dimensional and three-dimensional recognition using ordinary two-dimensional cameras disposed in an application-optimized manner with respect to a monitor display or passive surface. Such systems avoid the burden associated with a custom three-dimensional acquisition method, with attendant higher cost, size, and complexities Recognition algorithm 230 (FIG. 3) identifies key landmarks of the gesture or pointer object in the image acquired by the cameras. For instance, for a finger that is pointing to an object on the surface (e.g. an icon on an LCD), first the wrist and hand should be identified, and then the finger(s).

FIG. 5 depicts an exemplary flow chart for detection of a user's fingertips using the image from a single camera. The steps depicted in FIG. 5 are carried out within system 90 (see FIG. 3). While FIG. 5 describes detection of fingertip landmarks, a similar method flow applies to detection of other landmarks, perhaps user's arms, head, etc. In FIG. 5, at method step 300, camera frame information is read into a buffer in processor memory, e.g., memory 240 in FIG. 3. If camera 80-1 can acquire RGB information, hand color is an identifying clue to help recognize that the user object is a hand. But in practice hand color can change under different ambient lighting conditions. Therefore, step 310 uses chrominance ("UV") information, which is independent of luminance, to detect pixels matching hand color. Other clues such size and shape of the object can provide additional information for algorithm 230 (FIG. 3) to identify the pixels that are part of the hand. In step 320, pixels that are part of the hand are labeled after determining yes/no whether the pixel appears to belong to the hand image. At step 330, the hand centroid is estimated using the mass of pixels labeled as part of the hand at previous step 320. At step 340, the hand contour is determined. At step 350 data in the rows and columns in the camera pixel array are examined to determine the fingertips as being the data points farthest away from the hand centroid, determined at step 320. At step 360 a yes/no decision is made by algorithm 230 (FIG. 3), to verify that the resulting map of fingertip pixels indeed conform to the hand model. For instance, the count of the fingers in a single hand must not exceed five. If the fingertip arrangement does not conform to a hand model, step 370 performs a cleanup and returns to looking at the next frame at method step 300. Otherwise, if the fingertip data appears to conform to the hand model, the method progress and step 370 outputs the location in the camera pixel array, preferably providing sub-pixel column/row array location, of the fingertip in the image plane. Step 370 also provides identification for each finger (e.g., thumb, index, middle, ring, little). Step 370 can also use other information in the finger orientation, i.e., are the finger axes straight or bent, etc.

One of the user's fingers can be designated as a primary finger, a recognition that can be accomplished in the pixel array (x,y) image plane (see FIG. 4A) of at least one of the cameras. An important landmark is the sub (pixel) address (i.e., sub-pixel row and sub-pixel column in the camera pixel array) that represents the tip of the finger and the longitudinal axis that defines the finger's orientation. Of course in the camera image plane the axis is a projection of the actual axis of the fingertip in the three-dimensional hover zone near the monitor screen surface. The three-dimension estimation of axes is produced by intersecting corresponding rays from another camera, as explained herein. The axis need not be a straight line and can follow the natural curvature of the finger. When multiple fingers are involved in a gesture, the same definition applies to the tip of all visible fingers.

In practice, the (sub) pixel tip location of the finger in the camera image plane provides necessary but not sufficient information to locate the actual fingertip location of the user in some known world coordinate system (e.g., upper left corner of the monitor display screen). However, similar information can be acquired substantially simultaneously from multiple cameras. This information with a priori knowledge of camera calibration information enables estimating actual location of the user fingertip. This information can be used by another module in the software (e.g., 230, 240 in FIG. 3) to generate user-interface events to the target host system, e.g., 50 in FIGS. 1A-1J.

For a gesture object, the present invention seeks to recognize the user gesture and certain other gesture properties that are useful to implement a natural gesture-based user interface. The field of gesture recognition is a well-studied topic in the art, and aspects of the present invention provide a platform to implement gesture recognition algorithms. An exemplary result of a gesture recognition algorithm (e.g., 230, FIG. 3) is a series of landmark points, e.g., fingertips, digits, palm centroid, wrist centroid, that define the configuration of the gestures. In FIGS. 1A-1J, exemplary landmarks are denoted as circles on the display-facing surface of the user, e.g., A, B, C, D, E, etc. Cameras 80-1, 80-2 capture images of the user within hover zone 70, and the landmarks are identified by their (x,y) pixel locations in the image plane of each camera. Just as with a finger, not all landmarks of a given gesture can be visible to all cameras. However, through aggregating this information and establishing correspondence between them across all the cameras a very well picture of the user intention can be deduced. Understandably, generating landmark information using processor 84 within each camera 80-1, 80-2, etc. and transmitting only those relatively few data points can substantially reduce throughput of data to be communicated across the grid of camera. In-camera processing of image data can reduce the magnitude of data needed to represent landmark data from hundreds of kilobytes, to a few hundred bytes or less.

Three-dimensional reconstruction of landmarks on the user object will now be described. As noted, resolving a particular landmark in three-dimensional space requires information about the same (or nearby) point from multiple cameras.

Acquiring multiple views of a user object can be advantageous in dealing with problems of occlusion. Occlusion occurs when a segment of the object of interest becomes hidden behind another object from the vantage point of one or more cameras. If the object is hidden from both cameras, only higher level reasoning like the tracking over a number of frames can deduce the location of the object while it is hidden from both cameras. However, when a segment of an object of interest is hidden from only one camera, the image captured by the other camera can assist in producing useful information about the occluded area. In such instance, the system looks at the neighboring area that is visible to both cameras. This capability of multi-camera systems is very advantageous compared to what little can be done by prior art systems using a single view active light capture.

Event generation will now be described. Event generation is a function of system software that translates the user's visual natural interface actions to commands for the host system. This is not unlike events created by a modern operating system for applications, responsive to mouse and pen movements. In the present invention, gestural user interface events include identifying code and set parameters. The parameters provide additional information about the event, such as (x,y,z) coordinates of landmarks on the user, object orientation, size, etc. This information is obtained through the image analysis and three-dimensional reconstruction capabilities provided by the present invention.

During system 10 runtime, the calibration and registration information can be used for many purposes. Once the grid of cameras 80-1, 80-2, etc. are registered to a common global system, information from the multiple cameras can be correlated. For instance, a landmark, perhaps R in FIG. 1D-1, imaged by camera 80-1 can be said to lie in an epipolar line from another camera, 80-2. Alternatively, if the landmark, here R, for an object 60 is detected in the image planes of at least two cameras, e.g., 80-1, 80-2, the corresponding backward projection rays can be intersected to determine the three-dimensional position of the landmark in the global world coordinate system (see FIG. 4A).

FIG. 6 is a flow chart depicting exemplary method steps for detecting a fingertip landmark using epipolar geometric analysis including image rectification, according to the present invention. Method steps shown in FIG. 6 result from processor (e.g., CPU 200) execution of routine(s) 235 (see FIG. 3) and produce three-dimensional coordinates for a relatively few landmark points. In FIG. 6, assume that the user object being imaged is a hand, although of course in practice other or additional objects could be imaged. At method step 400, frames of images acquired by spaced-apart cameras 80-1 and 80-2 are read substantially simultaneously, preferably within about ±1 ms. If color cameras are used, preferably sensor filters are set so as to not change the color of the target objects of interest when the color of background objects changes. Color camera resolution may typically range from VGA (640×480), to HD 720p. Understandably when using HD cameras, compression should be reduced if compression artifacts are being created. In practice, acceptable compression levels can be achieved by trial and error by measuring performance metrics, including false positive and true negative object identification. At method step 400, we are dealing with a substantially large number N of data points comprising at most, all the pixels in camera 80-1 and all of the pixels in camera 80-2.

Method step 410 seeks to extract features of the acquired imagery that are relevant to identifying landmarks associated with a particular natural interface detection scenario. Without loss of generality, assume for ease of description that a goal is to find and accurate track the $(x_w, y_w, z_w)$ location in three-dimensional space of a pointed index fingertip of the system 10 user. Such use of an index finger is a natural way for humans to indicate directions, to identify a specific object, etc. A feature that helps finding a pointed index finger is the contour of the shape of the index finger connected to the rest of the user hand. In practice, at method step 410, edges of objects, e.g., hands, fingers, fingertips, in the frames acquired in step 400 are detected using an edge detection algorithm that reduces the acquired image to a description of a series of continuous edges. The edge identification procedure can be performed on frame data from camera 80-1, and optionally be repeated for the simultaneously acquired frame from camera 80-2. The edge detection algorithm typically applies gradient filters and computes edges by computing gradient magnitudes and directions. Method step 410 advantageously can reduce the number of candidate pixels where a hand object can be found by 90% or more. Coming out of step 410, the potential landmark points reside in the typically 10% or less of the number N data points that remain.

At method step 420, intelligent user hand model reasoning is applied. For example an index finger has to be part of a user hand, and if a hand object is not found and identified, it is most unlikely an index finger will be found. In preferred embodiments of the present invention, the existence of a hand object with an extended index finger in a particular region of the image comprising edges (and perhaps color information) is expressed with a probability. If a hand object with an extended finger is found with a relative high probability (e.g. >80% to 90%), the algorithm continues to method step 430. Otherwise, if a hand object is not recognized with high probability, the routine branches back to step 400, to fetch the next frame of image data. Preferably step 420 does not include a high threshold probability of finding a hand object, to preclude a high incidence of false negatives. False negatives imply there is a hand object in the image, but the algorithm does not detect it. It is preferable to reject subsequently in the processing flow an incorrect decision made at step 420. So doing does not increase false alarms or false positive, meaning a hand object is not in the image but the algorithm detects something that it incorrectly assumes to be a hand. In practice, method step 420 typically eliminates about 99% of the pixels in the original frame acquired at step 400. This is of course a substantial reduction of data, which promotes rapid data processing of landmark data, using inexpensive hardware, while enjoying substantially reduced latency times. Thus at step 420 a decision can be made with reasonably high probability as to whether the imaged object is or is not a hand. In step 420, the candidate landmark points reside is a set of data that is now culled down to about 1% or less of the number N referred to method step 400.

Method step 430 undertakes detection of a finger tip on the hand object. Preferably a reasoned basis for detection assumes certain hand and fingertip characteristics, for the current example being described. For example, an extended index finger typically appears as a cylinder shape extending outwardly from a roughly rectangle shape of folded fingers, with the distal end of the cylinder shape being a fingertip location. Method step 430 can reduce the list of candidate pixels potentially representing the fingertip by about at least 99.9% and more typically by at least 99.99%. Thus in step 430, the candidate landmark points reside is a set of data that is now culled down to about 0.1% or less of the number N referred to method step 400, and more preferably to about 0.01% or less. By way of example, if step 400 pertained to a frame of VGA resolution data, following step 430, perhaps thirty pixels will survive as candidates for the fingertip location. Understandably it is important to select a point location in the potential fingertip that is uniquely identifiable in image frame data from both cameras. An exemplary point would be the maxima of the crescent shape that defines a fingertip. Note that the found shape of a fingertip ensures there will be an uppermost point, even if the finger is pointed at an angle with respect to the cameras. Thus, data passing method step 430 will contain potential candidates for objects strongly believed to include a fingertip on the detected hand object.

Understandably substantial data for processing has already been eliminated, and method step 440 undertakes three-dimensional reconstruction for the relatively few candidates that probably represent a fingertip of the user hand object. This three-dimensional reconstruction will identify the $(x_w, y_w, z_w)$ real-world coordinates for the set of candidates that have survived method step 430. Intrinsic and extrinsic camera parameters including calibration parameters can be used, and can justify application of epipolar line geometric analysis to disambiguate candidates, as described herein with respect to FIGS. 4B-4G.

At method step 450 additional data is discarded for objects believed to be false fingertips, or objects that are out of distance boundary range of the overlapping FOVs of cameras 80-1, 80-2 to represent a fingertip. For example if the overlapping FOVs of the camera defines an operational imaging range of say 100 cm, then candidate landmark points that appear to be farther than 100 cm from the cameras are either too far away to be a valid fingertip, or the method has produced invalid data.

Method step 460 performs reasoned analysis on the dynamic behavior of surviving fingertip candidates. At this juncture, the present invention has information about the location of the best estimate of the fingertip from the previous frame of data from cameras 80-1, 80-2. The present invention also has data regarding the trajectory and perhaps an assumption as to speed of the probable fingertip. This information from the previous data frame, obtained earlier at step 400, can provide good hints about choosing the location of the most likely fingertip in the current frame of data. Using the original size of the frame as a reference, the results of method step 460 can generally eliminate at least 99.99% of the data, and more typically at least 99.999% of the data. Thus with respect to the number N referred to at step 400, step 460 can reduce the data to about 0.001% of N or better, and preferably to about 0.0001% of N or better. The remaining relatively few fingertip locations are passed with high confidence to method step 470 for output used to produce natural interface three-dimensional input events for host application 50 (or equivalent). At method step 470, each of the potential landmark locations can be characterized with confidence probabilities as being a type of user object. For example, perhaps landmark point D (see FIG. 1A) has a 95% probability of being a user right index finger, and a 5% probability of being a user's right thumb. Software associated with host device system 50 can ultimately decide whether the landmark is an index finger or a thumb, depending upon the application being run. Output from method step 470 could be used as input to interact with a true three-dimensional application that renders a true three-dimensional output.

It is useful to recapitulate some of the advantages of the present invention with reference to FIGS. 7A and 7B. FIG. 7A depicts major processing steps and many high data bandwidth requirements for a traditional prior art gesture recognizing system using full three-dimensional sensors. FIG. 7B depicts the major processing steps and relatively few high data bandwidth requirements for gesture sensing according to embodiments of the present invention.

In FIG. 7A, the prior art method at steps 500 and 510 captures frame data and color data, but at two different resolutions, high resolution A, perhaps RGB, and lower resolution B, perhaps z-pixel. A high bandwidth data transfer is required to couple the data from steps 500,510 to respective steps 520, 530. At step 520 color information is suppressed, and at step 530, registration with a three-dimensional image occurs. (As will be described shortly with respect to FIG. 6B, neither of these steps is required in the present invention.) In FIG. 7A again high bandwidth data transfer is required to couple information from steps 520, 530 to respective steps 540, 550. At step 540 a full three-dimensional cloud is created and at step 550 resolutions between high resolution A and lower resolution B are unified. (As will be described shortly with respect to FIG. 6B, neither of these steps is required in the present invention.) Yet again high bandwidth data transfers are required to couple information from steps 540, 550 to step 560, whereas application processing occurs in both three-dimensions and two-dimensions. The output from step 560 is then coupled via a low bandwidth data transfer to step 570, where three-dimensional coordinates are generated for the features captured by the prior art system.

Compare now FIG. 7B. At method steps 600, 610 image capture occurs at a common resolution for two cameras, e.g., 80-1, 80-2. A high bandwidth data transfer then couples this information to step 620, which performs application processing in two-dimensions. The step 620 is somewhat analogous to step 560 in prior art FIG. 7A, but note how many intermediate processing steps and attendant high bandwidth data transfer paths have been eliminated in FIG. 7B. In FIG. 7B a low bandwidth data transfer couples information from step 620 to step 630, where two-dimension features are produced. A low bandwidth data transfer then couples information from step 630 to step 640 where three-dimensional coordinates are produced, but only for a few landmark features in the images acquired by the cameras. As noted, in the '134 application, after step 630, method step 640 in FIG. 7B preferably is carried out as shown by FIG. 5. However, embodiments of the present invention preferably follow method step 630 with method step 640', preferably as shown in FIG. 6.

FIGS. 8A-8K depict latency, as improved by embodiments of the present invention. In a natural user interface application excessive processing latency can produce an unnaturally long time lag between the user's gesture or other interaction, and the time when a meaningful response is displayed on the system monitor or is otherwise manifested. In these figures, vertical tic marks along the horizontal line represent units of time on the order of perhaps 33.3 ms, e.g., exemplary time required to acquire a frame of data from the system cameras. It is assumed in these figures that similar tasks takes approximately similar times to carry out, and that transmission delays are subsumed in each block or epoch of time.

FIGS. 8A-8D show the true location position of a hand object as a function of time. Thus the hand object is shown moving at equally per unit time interval (e.g., constant speed) and is shown on a system two-dimensional monitor display with zero latency. In FIGS. 8A-8K, the actual location of the hand object is drawn with bold line, to distinguish from other representations of the hand object. FIGS. 8E-8H show the approximate length of time required by prior art algorithm methods to carry out given tasks, in terms of acquiring imagery, creating a three-dimensional data cloud, carrying out steps during detection middleware, and ultimately displaying the location of the detected hand on a system monitor display. Thus, in FIGS. 8E-8H, a unit time corresponds roughly to carrying out each of these prior art processing steps. FIG. 8E represents raw data capture, according to the prior art, a step that may involve multiple sub-captures, leading to a series of raw data used later to build a three-dimensional map of the imaged scene. Note that this prior art step shown in FIG. 8E does not produce three-dimensional data, but merely captures raw data that must be processed in the following step to produce a three-dimensional cloud. Assume then that this capture of raw data obtains an image of the hand object when the hand object is at the first time tic mark (see FIG. 8A). FIG. 8F represents creation of a data cloud per the prior art, a task depicted as requiring about one unit of time, during which time interval the hand object has moved to the second time tic mark (see FIG. 8B). In FIG. 8G the three-dimensional data cloud has been passed to prior art detection middleware software. This software carries out image processing of depth data to identify the hand object, and presumably also to find the fingertip. During this time, the hand object has actually moved to the third time tic mark. In FIG. 8H, the prior art processing pipeline displays the hand object, but at the first tic mark location where it was when the raw data was captured (see FIG. 8E). The time difference between the current true location of the hand object (fourth time tic mark) and what is produced and displayed from the processing pipeline (first time tic mark) is a measure of the latency of this prior art method. In this example the latency is three time units. If each time unit is say 33.3 ms, then the latency or time lag here is about 100 ms.

Referring now to FIGS. 8I-8J, a similar progression of events is depicted for embodiments of the present invention. FIG. 8I depicts substantially simultaneous image capture by cameras 80-1, 80-2, see FIG. 6, step 400. As such, image capture does not contribute to latency of system 10. FIG. 8J represents middleware image processing (see FIG. 6, step 410 to step 470), identification of a relatively few key landmark points, and rapid three-dimensional reconstruction location of only those key landmark points. Three dimensional reconstruction is quite fast as only a dozen to perhaps one hundred points require reconstruction. During this time interval the hand object has moved to the third time tic mark (shown by the bold line hand, and by FIG. 8C). Assuming a similar time required to display the image (first time tic mark) as required in the prior art, latency is seen to be two time units, or perhaps 66.6 ms, for the assumed frame rate. Thus, latency in embodiments of the present invention is at least about 33.3% better than in the prior art methods exemplified by FIG. 8H. Thus, not only do embodiments of the present invention employ inexpensive, small, lightweight generic cameras 80-1, 80-2, but also achieve faster throughput time. The low latency achieved by the present inventions achieves a more realistic natural user interface experience.

Those skilled in the art will appreciate that embodiments of the present invention could be deployed to produce a full three-dimensional cloud of positional information or video data for three-dimensional viewing. When so operated, classical stereoscopic methods can be used to generate the three-dimensional cloud.

Modifications and variations may be made to the disclosed embodiments without departing from the subject and spirit of the invention as defined by the following claims.

What is claimed is:

1. A method to enable a device to detect and use at least one user-made user-object interaction that represents a device-detectable event, wherein at least a portion of said user-object is representable by at least one landmark, the method including the following steps:
    (a) disposing a first camera, having a first FOV (field of view), and disposing a second camera, having a second FOV, such that intersecting said first FOV and second FOV define a three-dimensional hover zone within which said user-made user-object interaction is detectable by said device;
    (b) obtaining from said first camera a first two-dimensional image, comprising a first set of pixel data, of at least a portion of said user object, and obtaining from said second camera a second two-dimensional image, comprising a second set of pixel data, where a number N represents a maximum total data points acquirable by said first camera and by said second camera, wherein each said two-dimensional image is acquired within said three-dimensional hover zone;
    (c) analyzing said first set and said second set of pixel data obtained at step (b) to identify therein potential two-dimensional locations of landmark data points on said user object, said analyzing reducing data to a relatively small number of data points that are typically less than 10% N;
    (d) determining for at least some said two-dimensional locations identified in step (c) three-dimensional locations of potential landmarks on said user object, wherein said determining reduces remaining data to a sparse set of three-dimensional data typically less than 1% N;
    (e) using three-dimensional locations determined at step (d) and using dynamic information for data remaining after step (d) to further reduce a number of three-dimensional locations of potential landmarks on said user-object by at least a factor of 10 to typically less than 0.1% N;
    wherein reduced three-dimensional data following step (e) is outputtable to said device to affect at least one device parameter responsive to detected user-object interaction.

2. The method of claim 1, further including at least one limitation selected from a group consisting of:
    (i) step (c) includes reducing said relatively small number of data points to less than typically about 1% N, (ii) step (d) reduces said spare set of data to less than typically about 0.1% N, and (iii) step (e) further reduces a number of three-dimensional locations of potential landmarks to less than typically about 0.1% N.

3. The method of claim 1, wherein step (c) has at least one characteristic selected from a group consisting of edge detection, and object modeling.

4. The method of claim 1, wherein step (d) includes at least one method selected from a group consisting of image rectification, and epipolar geometric analysis.

5. The method of claim 1, said user-object is a user, and said landmark includes at least one landmark selected from a group consisting of (i) approximate centroid of said user's body, (ii) approximate centroid of said user's head, (iii) approximate centroid of said user's hand, (iv) approximate centroid of said user's finger, (v) approximate location of said user's fingertip, (vi) approximate location of said user's shoulder joint, (vii) approximate location of said user's knee joint, and (viii) approximate location of said user's foot.

6. The method of claim 1, wherein:
    said device is functionally coupleable to a display having a display surface; and
    said user-object interaction includes at least one interaction selected from a group consisting of said user-object physically touches said display surface, and said user-object makes a gesture in a region of said three-dimensional hover zone without physically touching said display surface; and wherein said device in response to output from step (e) creates at least one instruction usable by said device, in response to a detected said user-object interaction, said at least one instruction causing at least one action selected from a group consisting of (i) said instruction causes said device to alter at least a portion of an image presented on said display, (ii) said instruction causes said device to issue an audible sound, (iii) said instruction causes said device to alter a characteristic of said device, and (iv) said instruction causes a change in orientation in said first camera relative to said second camera.

7. The method of claim 6, wherein said device includes at least one of a gyroscope and an accelerometer, and wherein data outputtable from step (e) is modifiable by data from at least one of said gyroscope and accelerometer to alter an image on said display.

8. The method of claim 6, wherein:
said display has a characteristic selected from a group consisting of said display and said device share a common housing, and said display is separate from said device;
said first camera has at least one characteristic selected from a group consisting of (i) same pixel resolution to pixel resolution of said second camera, (ii) greater pixel resolution than pixel resolution of said second camera, (iii) same spectral sensitivity as spectral sensitivity of said second camera, and (iv) greater spectral sensitivity than spectral sensitivity of said second camera; and
said device includes at least one device selected from a group consisting of (i) a smart phone, (ii) a tablet, (iii) a netbook, (iv) a laptop, (v) an e-book reader, (vi) a PC, (vii) a TV, and (viii) a set top box.

9. The method of claim 6, wherein step (a) includes disposing said first camera and said second camera such that said three-dimensional hover zone has at least one characteristic selected from a group consisting of said three-dimensional hover zone is adjacent said surface of said display, and said three-dimensional hover zone is adjacent said surface of said display and includes at least a region of said surface of said display.

10. The method of claim 6, wherein a cross-section of said three-dimensional hover zone taken parallel to said display surface has a size that is at least as large as a diagonal dimension of said display.

11. A system to detect and use at least one user-made user-object interaction that represents a device-detectable event, wherein at least a portion of said user-object is representable by at least one landmark, the system including:
a first camera, having a first FOV (field of view), and a second camera, having a second FOV, disposed such that intersecting said first FOV and second FOV define a three-dimensional hover zone within which said user-made user-object interaction is detectable by a device;
means for obtaining a first two-dimensional image from said first camera of at least a portion of said user object within said three-dimensional hover zone, and obtaining a second two-dimensional image from said second camera having of at least a portion of said user object in said three-dimensional hover zone, wherein said first image comprises a first set of pixel data, and said second image comprises a second set of pixel data, where a number N represents a maximum total data points acquired by said first and by said second set of pixel data;
means for analyzing said first and second set of pixel data, obtained by said means for obtaining, to identify in said pixel data potential two-dimensional locations of landmark data points on said user object, such that data reduction to less than typically about 10% N occurs;
means for determining for at least some said two-dimensional locations, identified by said means for analyzing, a sparse set of three-dimensional data locations of potential landmarks on said user object, said sparse set wherein remaining data is less than typically about 1% N;
means for further reducing, coupled to use three-dimensional locations determined by said means for determining and coupled to use dynamic information for data remaining of potential landmarks to less than typically about 0.1% N;
wherein three-dimensional data obtained from said means for using is outputtable to said device to affect at least one device parameter responsive to detected user-object interaction.

12. The system of claim 11, further including at least one limitation selected from a group consisting of:
(i) said means for analyzing reduces said relatively small number of data points to less than typically about 1% N, (ii) said means for determining reduces said sparse set of data to less than typically about 0.1% N, and (iii) said means for further reducing further reduces a number of three-dimensional locations of potential landmarks to less than typically about 0.01% N.

13. The system of claim 11, wherein said means for analyzing has at least one characteristic selected from a group consisting of (i) analysis includes edge detection, and (ii) analysis includes object modeling.

14. The system of claim 11, wherein said means for determining uses at least one analytical technique selected from a group consisting of (i) image rectification, and (ii) epipolar geometric analysis.

15. The system of claim 11, wherein said-user object is a user, and said landmark includes at least one landmark selected from a group consisting of (i) approximate centroid of said user's body, (ii) approximate centroid of said user's head, (iii) approximate centroid of said user's hand, (iv) approximate centroid of said user's finger, (v) approximate location of said user's fingertip, (vi) approximate location of said user's shoulder joint, (vii) approximate location of said user's knee joint, and (viii) approximate location of said user's foot.

16. The system of claim 11, further including a display having a display surface, wherein said device is functionally coupleable to said display; and
said user-object interaction includes at least one interaction selected from a group consisting of (i) said user-object physically touches said display surface, and (ii) a gesture made by said user-object in a region of said three-dimensional hover zone without physically touching said display surface; and
wherein said device in response to output from means for using creates at least one instruction usable by said device, in response to a detected said user-object interaction, said at least one instruction causing at least one action selected from a group consisting of (i) said instruction causes said device to alter at least a portion of an image presented on said display, (ii) said instruction causes said device to issue an audible sound, (iii) said instruction causes said device to alter a characteristic of said device, and (iv) said instruction causes a change in orientation in said first camera relative to said second camera.

17. The system of claim 16, wherein said device includes at least one of a gyroscope and an accelerometer, and wherein data outputtable from said means for further reducing is modifiable by data from at least one of said gyroscope and accelerometer to alter an image on said display;
   wherein said display has a characteristic selected from a group consisting of said display and said device share a common housing, and said display is separate from said device; and
   said device includes at least one device selected from a group consisting of (i) a smart phone, (ii) a tablet, (iii) a netbook, (iv) a laptop, (v) an e-book reader, (vi) a PC, (vii) a TV, and (viii) a set top box.

18. The system of claim 16, wherein said first camera and said second camera are disposed such that said three-dimensional hover zone has at least one characteristic selected from a group consisting of said three-dimensional hover zone is adjacent said surface of said display, and said three-dimensional hover zone is adjacent said surface of said display and includes at least a region of said surface of said display.

19. The system of claim 16, wherein a cross-section of said three-dimensional hover zone taken parallel to said display surface has a size that is at least as large as a diagonal dimension of said display.

20. A hand-holdable electronic device enabling at least one user-object interaction in a three-dimensional hover zone with an image presented on a display, said interaction creating a detectable event useable by said electronic device, where at least a portion of said user-object is representable by at least one landmark, the electronic device including:
   a housing;
   a processor-controller unit including a processor coupled to memory storing at least one routine executable by said processor, said processor-controller unit disposed in said housing;
   a display having a display surface, coupled to said processor-controller unit, able to present user viewable images responsive to commands from said processor-controller unit, said display integrally joined to said housing;
   at least a first camera having a first FOV and a second camera having a second FOV, said first and second camera disposed such an intersection of said first FOV and second FOV defines said three-dimensional hover zone;
   said processor controller unit further including:
   means for obtaining a first two-dimensional image from said first camera of at least a portion of said user object within said three-dimensional hover zone, and obtaining a second two-dimensional image from said second camera having of at least a portion of said user object in said three-dimensional hover zone, wherein said first image comprises a first set of pixel data, and said second image comprises a second set of pixel data, where a number N represents a maximum total data points acquired by said first and by said second set of pixel data;
   means for analyzing said first and second set of pixel data, obtained by said means for obtaining, to identify in said pixel data potential two-dimensional locations of landmark data points on said user object, such that data reduction to substantially less than typically about 10% N occurs;
   means for determining for at least some said two-dimensional locations, identified by said means for analyzing, three-dimensional locations of potential landmarks on said user object, wherein remaining data is substantially less than typically about 1% N;
   means for further reducing, coupled to use three-dimensional locations determined by said means for determining and coupled to use dynamic information for data remaining of potential landmarks to less than typically about 0.1% N;
   wherein three-dimensional data obtained from said means for further reducing is coupled to said electronic device to affect at least one device parameter selected from a group consisting of (i) causing said electronic device to alter at least a portion of an image presented on said display, (ii) causing said electronic device to issue an audible sound, (iii) causing said electronic device to alter a characteristic of said electronic device, and (iv) causing a change in orientation in said first camera relative to said second camera; and
   wherein said electronic device includes at least one device selected from a group consisting of (i) a smart phone, (ii) a tablet, (iii) a netbook, (iv) a laptop, (v) an e-book reader, (vi) a PC, (vii) a TV, and (viii) a set top box.

21. The hand-holdable electronic device of claim 20, wherein:
   said means for analyzing includes at least one analytical technique selected from a group consisting of (i) edge detection, and (ii) object modeling; and
   said means for determining includes at least one analytical technique selected from a group consisting of (i) image rectification, and (ii) epipolar geometric analysis.

22. The hand-holdable electronic device of claim 20, further including at least one of a gyroscope and an accelerometer, wherein data from said means for further reducing is modifiable by data from at least one of said gyroscope and accelerometer and outputtable to said device so as to alter an image on said display.

23. The hand-holdable electronic device of claim 20, wherein said three-dimensional hover zone has at least one characteristic selected from a group consisting (i) said three-dimensional hover zone is adjacent said surface of said display, (ii) said three-dimensional hover zone is adjacent said surface of said display and includes at least a region of said surface of said display, and said three-dimensional hover zone has a cross-section taken parallel to said display surface has a size that is at least as large as a diagonal dimension of said display.

* * * * *